(12) United States Patent
Dorsey et al.

(10) Patent No.: US 10,437,313 B2
(45) Date of Patent: Oct. 8, 2019

(54) PROCESSOR UNIT EFFICIENCY CONTROL

(71) Applicant: Apple Inc., Cupertino, CA (US)

(72) Inventors: John G. Dorsey, San Francisco, CA (US); Christopher W. Chaney, Saratoga, CA (US); Norman J. Rohrer, San Jose, CA (US); Cyril De La Cropte De Chanterac, San Francisco, CA (US)

(73) Assignee: Apple Inc.

( * ) Notice: Subject to any disclaimer, the term of this patent is extended or adjusted under 35 U.S.C. 154(b) by 187 days.

(21) Appl. No.: 15/275,213

(22) Filed: Sep. 23, 2016

(65) Prior Publication Data

US 2017/0357302 A1 Dec. 14, 2017

Related U.S. Application Data

(60) Provisional application No. 62/348,293, filed on Jun. 10, 2016.

(51) Int. Cl.
*G06F 1/3287* (2019.01)
*G06F 1/3206* (2019.01)
*G06F 1/324* (2019.01)

(52) U.S. Cl.
CPC ............ *G06F 1/3287* (2013.01); *G06F 1/324* (2013.01); *G06F 1/3206* (2013.01); *Y02D 10/171* (2018.01)

(58) Field of Classification Search
CPC ....... G06F 1/3206; G06F 1/324; G06F 1/3287
See application file for complete search history.

(56) References Cited

U.S. PATENT DOCUMENTS

| 6,003,079 | A | * | 12/1999 | Friedrich | ............ H04L 41/5035 |
| | | | | | 709/223 |
| 7,093,147 | B2 | | 8/2006 | Farkas et al. | |
| 7,814,485 | B2 | | 10/2010 | Morgan et al. | |
| 8,284,205 | B2 | | 10/2012 | Miller et al. | |
| 8,448,000 | B2 | | 5/2013 | Culbert et al. | |
| 8,662,943 | B2 | | 3/2014 | Conroy et al. | |
| 9,195,291 | B2 | | 11/2015 | Lee | |
| 9,354,689 | B2 | | 5/2016 | Bhandaru et al. | |
| 2005/0188189 | A1 | * | 8/2005 | Yeung | .................. G06F 1/3203 |
| | | | | | 713/1 |
| 2007/0124616 | A1 | * | 5/2007 | Gonzalez | .............. G06F 9/3885 |
| | | | | | 713/300 |

(Continued)

*Primary Examiner* — Jaweed A Abbaszadeh
*Assistant Examiner* — Gayathri Sampath
(74) *Attorney, Agent, or Firm* — Jaffery Watson Mendonsa & Hamilton LLP

(57) ABSTRACT

Embodiments provide for a computer implemented method comprising sampling one or more power and performance metrics of a processor; determining an energy cost per instruction based on the one or more power and performance metrics; determining an efficiency metric based on the energy cost per instruction; computing an efficiency control error based on a difference between a current efficiency metric and a target efficiency metric; setting an efficiency control effort based on the efficiency control error; determining a performance control effort, the performance control effort determined by a performance controller for the processor; and adjusting the performance control effort based on the efficiency control effort, wherein adjusting the performance control effort reduces power consumption of the processor.

20 Claims, 15 Drawing Sheets

(56) References Cited

U.S. PATENT DOCUMENTS

| | | | |
|---|---|---|---|
| 2009/0327656 A1 | 12/2009 | Baum et al. | |
| 2011/0022870 A1* | 1/2011 | McGrane | G06F 1/3203 713/340 |
| 2011/0314306 A1* | 12/2011 | Lin | G06F 1/3203 713/300 |
| 2012/0173895 A1* | 7/2012 | Kim | G06F 1/3206 713/300 |
| 2013/0024713 A1* | 1/2013 | Bajic | G06F 1/3206 713/340 |
| 2014/0281609 A1* | 9/2014 | Hanumaiah | G06F 1/206 713/320 |
| 2016/0062390 A1 | 3/2016 | Hlonde et al. | |

* cited by examiner

PROCESSOR UNIT EFFICIENCY CONTROL

CROSS-REFERENCE

The present application is a non-provisional application claiming the benefit of U.S. Provisional Application No. 62/348,293 filed on Jun. 10, 2016, which is hereby incorporated herein by reference.

BACKGROUND OF THE DISCLOSURE

Processors may use performance control logic to dynamically vary the frequency and voltage of a processor or processor core based on the computational demands placed on the processor. This can be particularly of use in battery-operated systems where minimizing power consumption is important for enabling extended use. In general, performance control logic operates by monitoring the operational state of the processor and dynamically adjusting the voltage and clock frequency of the processor to provide increased performance under high computational loads and reduced power consumption under minimal load or idle conditions. However, increasing the performance of a processor may result in reduced system efficiency and battery life. Moreover, the increased processor performance may result in a significantly higher thermal load on the processor or other components within an electronic device that incorporates the processor.

SUMMARY OF THE DESCRIPTION

Various embodiments are described in which efficiency control logic within a data processing system or an electronic device perform continuous analysis of the efficiency of processor operations and limits the highest levels of processor performance to those operations that may be performed efficiently.

One embodiment provides for a computer implemented method comprising sampling one or more power and performance metrics of a processor; determining an energy cost per instruction based on the one or more power and performance metrics; determining an efficiency metric based on the energy cost per instruction; computing an efficiency control error based on a difference between a current efficiency metric and a target efficiency metric; setting an efficiency control effort based on the efficiency control error; determining a performance control effort, the performance control effort determined by a performance controller for the processor; and adjusting the performance control effort based on the efficiency control effort, wherein adjusting the performance control effort reduces power consumption of the processor.

One embodiment provides for a non-transitory machine-readable medium storing instructions which, when executed by a processor complex including one or more processors, cause the processor complex to perform operations comprising determining an efficiency metric based on an energy cost per instruction of one or more processors of the processor complex; computing an efficiency control error based on a difference between a current efficiency metric and a target efficiency metric; setting an efficiency control effort based on the efficiency control error; determining a performance control effort, the performance control effort determined by a performance controller for the processor complex; and adjusting the performance control effort based on the efficiency control effort, wherein adjusting the performance control effort reduces power consumption of the processor complex.

One embodiment provides for a data processing system comprising processing logic, an efficiency control effort determination module to determine an efficiency control effort for the processing logic, the efficiency control effort determined based on an energy cost per instruction; a performance control effort input module to receive a performance control effort determined for the processing logic, the performance control effort to set a requested performance level for the processing logic; and a performance control effort limiting module to limit the performance control effort received by the performance control effort input module based on the efficiency control effort, the performance control effort limiting module to cause a reduction in the performance level of the processing logic or a reduction in a requested increase in the performance level of the processing logic.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Various embodiments described herein provide for processor unit efficiency control. In one embodiment an efficiency control system for a data processing system includes an efficiency control module that can be integrated within an efficiency controller. The efficiency control effort module can be configured to determine a processor efficiency metric and limit the maximum levels of processor performance to workloads that execute efficiently on the processor, while causing the processor to execute inefficient workloads at a lower level of processor performance. In one embodiment the processing efficiency is determined as a measurement of energy consumed per instruction. The energy consumption estimates can be analyzed in light of instruction rate metrics reported by a processor or a group of processors.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Moreover, specific details of embodiments are illustrated in detail in certain figures, but in differing detail in others. One having ordinary skill in the art will understand that details shown and/or illustrated for one embodiment may be combined with details shown and/or illustrated for other, similar embodiments. In certain instances, well-known or conventional details are not described in order to provide a concise discussion of various embodiments of the present invention.

The processes depicted in the figures that follow are performed by processing logic that comprises hardware (e.g. circuitry, dedicated logic), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Subsystem Overview of a Data Processing System

Figure 1:
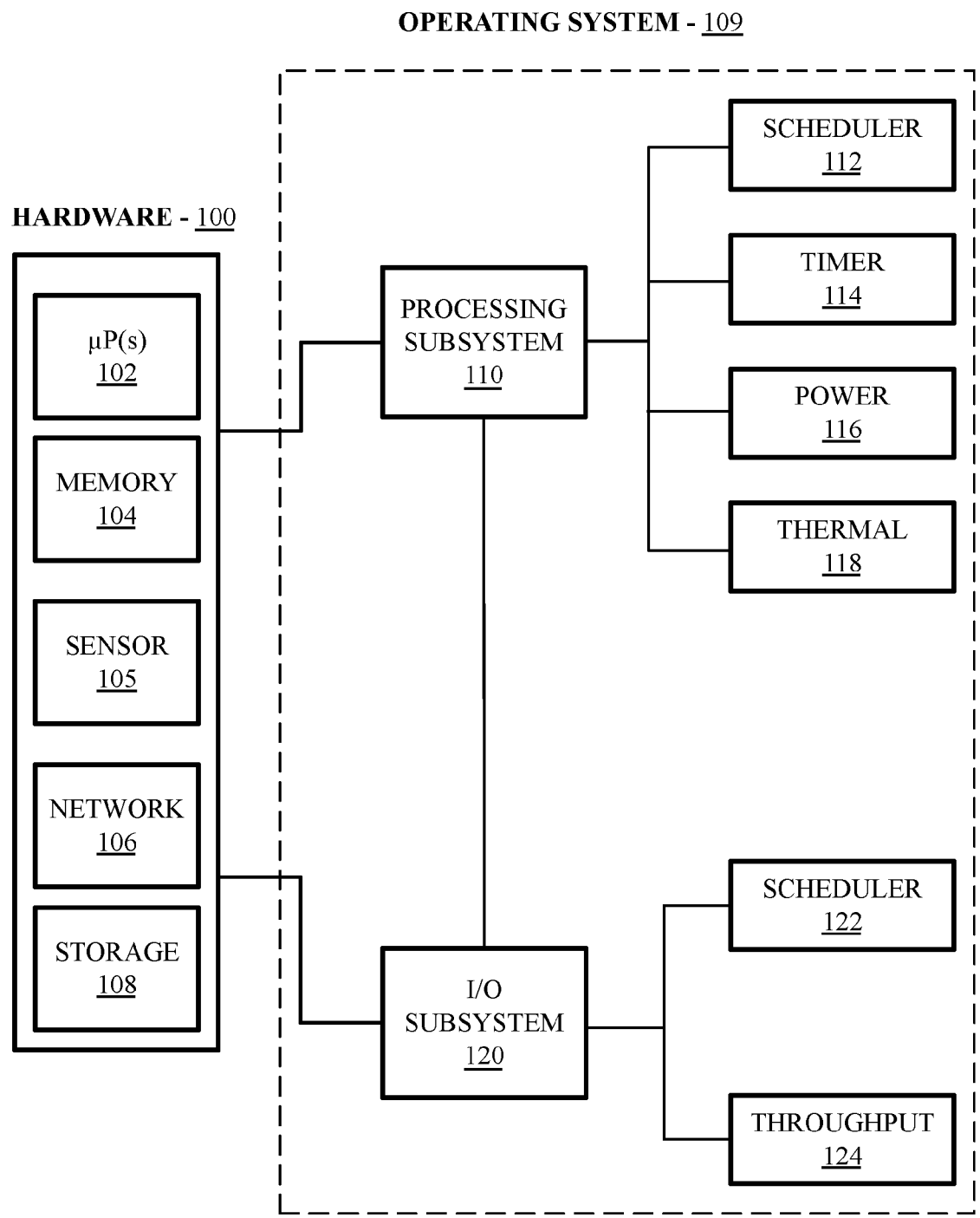
FIG. 1 is a block diagram illustrating subsystem components of a data processing system according to embodiments described herein.

FIG. 1 is a block diagram illustrating subsystem components of a data processing system according to embodiments described herein. The data processing system includes hardware 100 and software components, including operating system software 109. In one embodiment, the operating system software 109 manages task, process, and thread access to hardware 100 via one or more subsystems, including a processing subsystem 110 and an input/output (I/O) subsystem 120. The processing subsystem 110 includes a scheduler 112, as well as timer 114, power 116, and thermal 118 managers. The I/O subsystem 120 includes a scheduler 122 and a throughput manager 124. Each illustrated element of the processing subsystem 110 or I/O subsystem 120 can be a task, process, or thread executing on one or more microprocessor devices 102 (e.g., µP(s)) of the hardware 100. In one embodiment the hardware 100 includes the one or more microprocessor devices, as well as memory 104, one or more sensor 105, network 106, and storage 108 devices.

In one embodiment, the processing subsystem 110 manages life cycle and scheduling for tasks, process, and threads executing on the one or more microprocessor devices 102, while the I/O subsystem 120 manages and arbitrates access to I/O devices, such as the network 106 and storage 108 devices. I/O scheduling and throughput can be controlled by an I/O scheduler 122 and throughput manager 124 using several priority based methods that can be tuned based on various priority values.

In one embodiment, the scheduler 112 of the processing subsystem 110 can assign a schedule priority to indicate the urgency or importance associated with a task, process, or thread. Embodiments described herein can manage execution at several levels of abstraction, including a task or process abstraction and a thread abstraction. Tasks and processes are similar and are used interchangeably herein. A task or process describes a unit of resource ownership including a virtual address space and one or more threads. A thread is a unit execution within a task or process, and is the smallest sequence of programmed instructions that can be managed by the scheduler 112 of the processing subsystem 110.

In one embodiment, the schedule priority is assigned to a task or thread based in a QoS classification. The specific QoS classifications can vary according to embodiments, but are generally determined based on the maximum acceptable latency for execution of a given task. Accordingly, the highest priority QoS classes (e.g., A/V rendering, user interactive) are associated with tasks that perform real-time audio or video rendering or define or manage interactive user interface elements, allowing threads associated with those tasks to be scheduled for processing ahead of other tasks. Additionally, a task with a higher priority or QoS class relative to other executing tasks may be allowed to consume a larger amount of processor resources, allowing the task to be more responsive to input relative to a task having a lower priority (e.g., background tasks) provided sufficient processor resources exist to service all high priority tasks. In one embodiment, the hardware 100 and operating system software 109 can be configured to dynamically increase or decrease the amount of available processing resources based on the thread scheduling latency experienced by threads executed by the processing subsystem 110, as further described in relation to FIG. 2.

Processing Subsystem Performance and Efficiency Management

Figure 2:
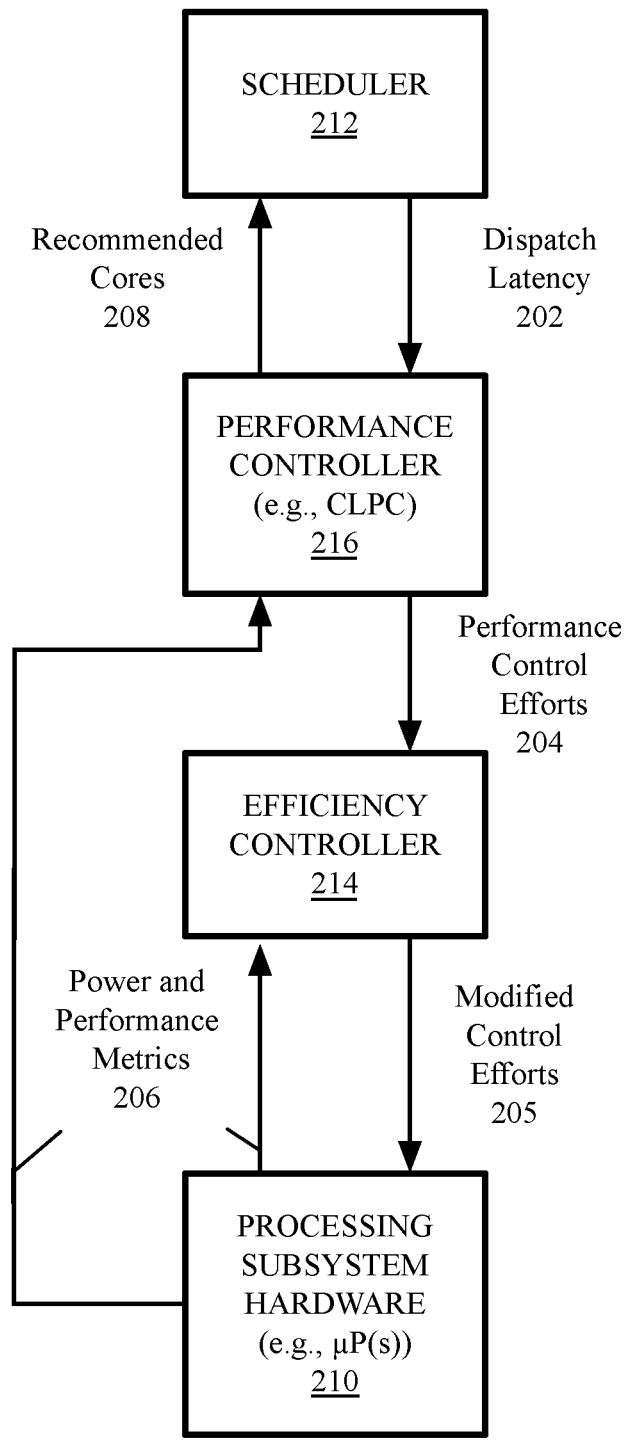
FIG. 2 is a block diagram of an efficiency and performance control system, according to an embodiment.

FIG. 2 is a block diagram of an efficiency and performance control system 200, according to an embodiment. The efficiency and performance control system 200 includes processing subsystem hardware 210 to execute tasks and a scheduler 212 to schedule tasks to execute on the processing subsystem hardware 210. The efficiency and performance control system 200 additionally includes a performance controller 216 and an efficiency controller 214. The performance controller 216 may be a closed loop performance controller (CLPC) that operates in conjunction with the scheduler 212. In one embodiment, the scheduler 212 is or includes scheduler 112 of the processing subsystem 110 of FIG. 1. In one embodiment the performance controller 216 is integrated within logic of a programmable power management integrated circuit included within a dynamic voltage and frequency management system. In one embodiment the performance controller 216 is integrated within logic of an operating system power manager (e.g., power 116 manager of FIG. 1). The processing subsystem hardware 210 can include one or more microprocessor devices, which may be multi-core processor devices. In one embodiment, the processing subsystem hardware 210 includes multiple processors or processor cores that may be enabled or disabled based on performance metrics such as scheduling latency and processor utilization.

During operation the scheduler 212 can schedule threads for execution on the processing subsystem hardware 210 to different processor cores based on available processing resources. The processing subsystem hardware 210 be managed by the scheduler 212 via preemptive multitasking, in which the scheduler 212 uses some criteria to determine how long to allocate to any one thread before preempting the thread and allowing an additional thread to execute. At least one thread can be scheduled on each available core of the processing subsystem hardware 210. In one embodiment, the performance controller 216 sends a count or a set of recommended cores 208 to the scheduler 212 and the scheduler 212 schedules tasks only to the set of recommended cores 208. During periods of high processor utilization, the performance controller 216 can increase the number of cores in the set of recommended cores 208, or can recommend a different set of cores. In one embodiment, power and performance metrics 206 received by the performance controller 216 can be used in conjunction with dispatch latency 202 to provide a set of recommended cores 208 to the scheduler 212.

In one embodiment, for each scheduled thread, the scheduler 212 can report to the performance controller 216 the dispatch latency 202 observed while attempting to schedule the thread on the processing subsystem hardware 210. The dispatch latency 202 can be determined based on the latency observed by the scheduler 212 between receiving a thread dispatch request and dispatching the thread to the processing subsystem hardware 210. The performance controller 216 can use the received dispatch latency 202 to set one or more performance control efforts 204 associated with a performance state for the processing subsystem hardware 210.

In one embodiment the one or more performance control efforts 204 generated by the performance controller are moderated by the efficiency controller 214 to limit the highest levels of processor performance to software that may be efficiently executed by the processing subsystem hardware 210. The efficiency controller 214 can receive at least a subset of the power and performance metrics 206 that are sent to the performance controller by the processing subsystem hardware 210. The performance controller 216 uses the power and performance metrics 206 to determine if the performance control efforts 204 should be increased, resulting in an increase in available processing resources or an increase in the performance of the available processing resources. The efficiency controller 214 uses the power and performance metrics 206 to generate one or more modified control efforts 205 which limit the ability of the processing subsystem hardware 210 to reach the highest available levels of performance unless the currently executing workload is executing efficiently, for example, with an energy cost per instruction that is below a target efficiency level.

In various embodiments, the modification of the performance control efforts 204 to generate the one or more modified control efforts 205 can reduce overall power consumption of the processing subsystem hardware 210. The modified control efforts 205 can result in a reduction in a requested increase in performance of the processing subsystem hardware 210, such that a magnitude of a voltage and/or frequency increase of the processing subsystem hardware 210 is reduced. Under some circumstances, the modified control efforts 205 can result in a decrease in the performance level of the processing subsystem hardware 210 to cause the hardware to operate at reduced performance but increased efficiency. This may result in a reduction in a voltage and/or frequency of the processing subsystem hardware 210, or may result in the throttling or idling of less efficient components of the processing subsystem hardware 210.

Figure 3:
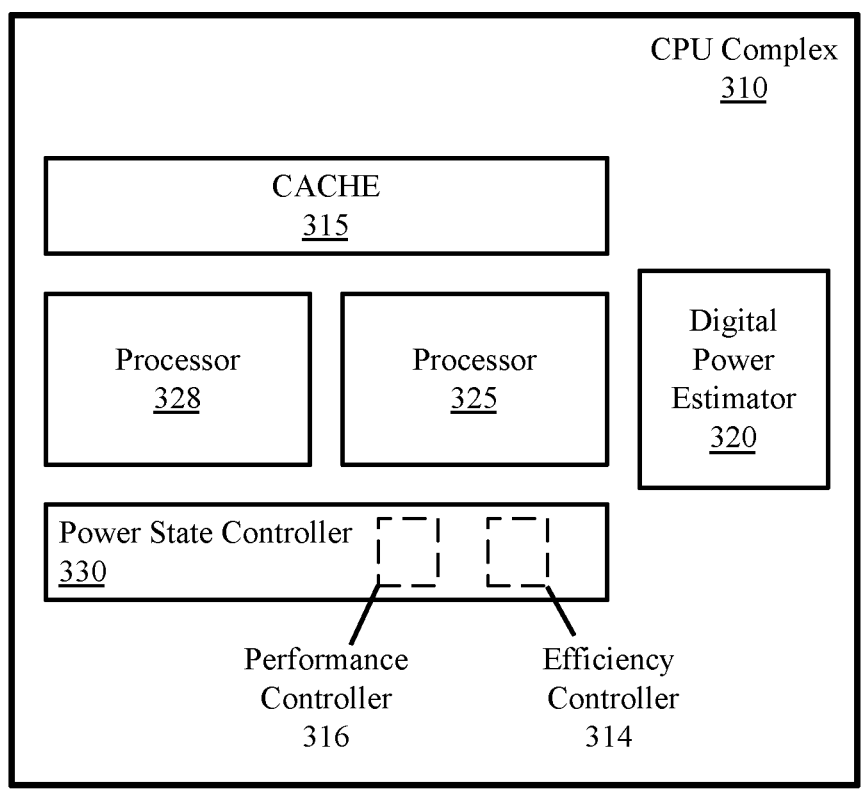
FIG. 3 is a block diagram of a processing subsystem, according to an embodiment.

FIG. 3 is a block diagram of a processing subsystem 300, according to an embodiment. The processing subsystem 300 includes a central processing unit (CPU) complex 310 having multiple processors (e.g., processor 325, processor 328). The processors of the CPU complex 310 can be various types of processors, such as but not limited to application processors, graphics processors, digital signal processors, audio or media processors, or baseband processors. Each of the processors 325, 328 can include a single processor core or multiple processor cores. The processors 325, 328 can be homogenous processors of a single type or heterogeneous processors having different microarchitectures or configured to execute different instruction set architectures. Additionally, one or more of the processors 325, 328 can be heterogeneous and include processor cores of different types, such as a graphics processor, one or more application processors, and/or a baseband processor.

The CPU complex 310 can additionally include cache memory 315, such as an level 2 (L2) cache or a level 3 (L3) cache memory, as well as a digital power estimator 320. The cache memory 315 can be used to cache recently used or pre-fetched instructions and data to reduce the amount of time required by the one or more processors to access the instructions or data. The digital power estimator 320 (DPE) can monitor instructions executed by the CPU complex 310 and accumulate a power estimate of the power consumption of the CPU complex based on the executed instructions. In some embodiments the CPU complex 310 additionally includes a power state controller 330. In one embodiment the power state controller 330 includes logic associated with an efficiency controller 314 and a performance controller 316, which is a variant of the performance controller 216 and efficiency controller 214 as in FIG. 2.

The digital power estimator 320 is configured to estimate the amount of power consumed by a processor when executing an instruction. In various embodiments the digital power estimator 320 can be configured to perform the power estimation using a variety of techniques. In one embodiment the digital power estimator 320 is aware of the instructions processed by each processor and an accumulator is incremented by a pre-determined amount based on the type of executed instruction. A power estimate can be determined based on the internal components of a processor that are utilized when executing an instruction. For example, an integer instruction can be associated with a first power estimate while a floating point instruction can be associated with a second power estimate. Additionally, a vector or single instruction multiple data (SIMD) instruction can be associated with a higher power estimate relative to a scalar instruction. In one embodiment different power estimates can also be associated with the precision of the instruction. For example, a 32-bit floating point instruction can be associated with a lower power estimate than a 64-bit floating point instruction.

In one embodiment a configurable set of weights may be associated with an instruction or an instruction type to enable fine-tuning of the power estimate based on instruction type. The weight values can be configured during initialization of the digital power estimator 320 and can be adjusted on a per-processor basis.

It is noted that the number of components of the processing subsystem 300, such as within the CPU complex 310, may vary from embodiment to embodiment, as there may be more or fewer of each component/subcomponent than shown in FIG. 3.

Figure 4:
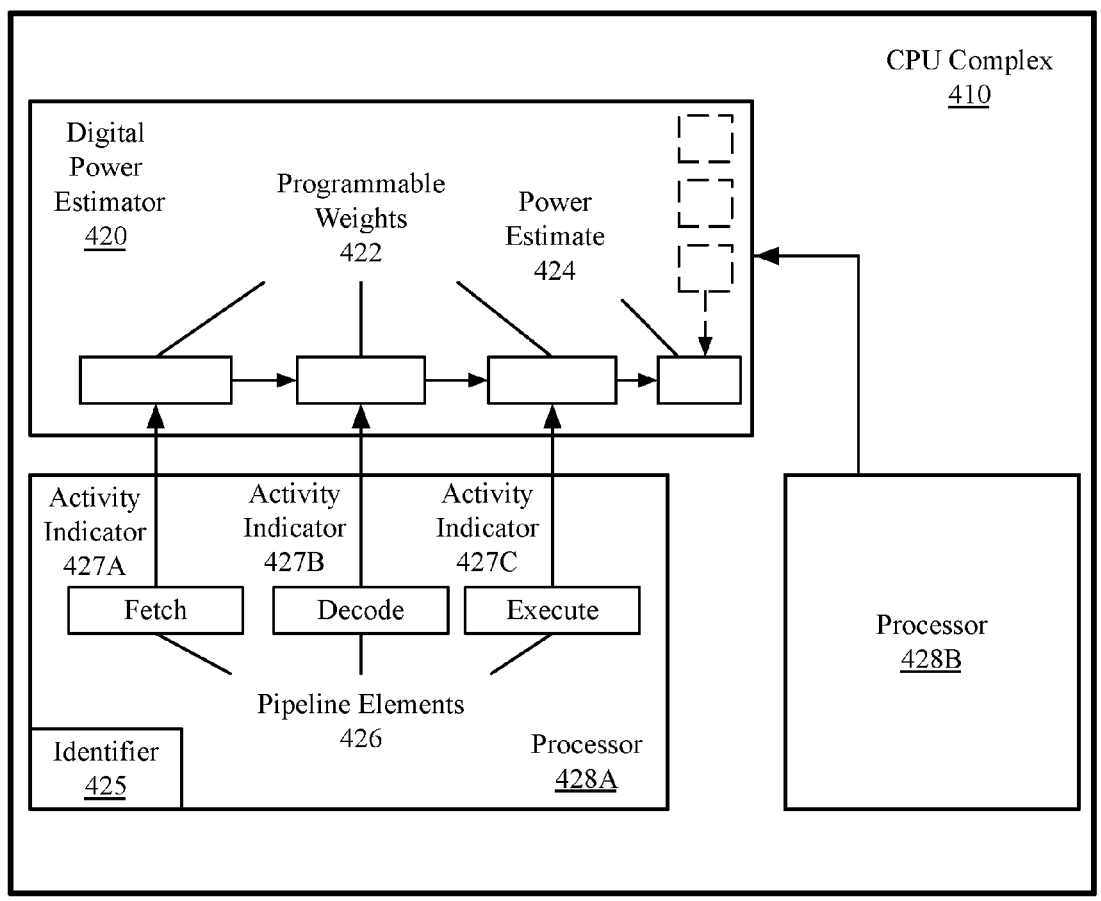
FIG. 4 is a block diagram of a processing system, according to an embodiment.

FIG. 4 is a block diagram of a processing subsystem 400, according to an embodiment. The processing subsystem 400 can be a variant of the processing subsystem 300 of FIG. 3, and includes a CPU complex 410, a digital power estimator 420, and multiple processors 428A, 428B. The digital power estimator 420 can perform power estimation for a selected one of the processors of the CPU complex 410, a subset of the processors, or all processors.

In one embodiment the digital power estimator 420 estimates the power consumed by a processor when executing instructions via a set of activity indicators 427A, 427B, 427C. The activity indicators 427A, 427B, 427C are associated with a set of pipeline elements 426 of a processor (e.g., processor 428A). In one embodiment, pipeline elements 426 including fetch, decode, and execute are illustrated, although the specific pipeline elements that provide activity indicators varies among embodiments. Based on the type of instruction activity within a processor, pipeline elements 426 can indicate the current degree of pipeline activity to the digital power estimator, which can accumulate a power estimate 424 for reporting to power control logic, such as the power state controller 330 of FIG. 3. While power estimation via the activity indicators 427A, 427B, 427C is indicative of the power estimation mechanism used by one embodiment, other embodiments may use different estimation methods, such as estimation based on the type of instructions executed or the specific instructions executed, without requiring the use of activity indictors 427A, 427B, 427C from pipeline elements 426 of a processor.

For each mechanism of power estimation, the digital power estimator 420 is configured to estimate power consumption based on the complexity of executed instructions. The estimation can be fine tuned via the use of tunable or programmable weights. In one embodiment, as in the illustrated processing subsystem 400, the digital power estimator 420 includes programmable weights 422 that may be associated with each of the activity indicators 427A, 427B, 427C. The programmable weights may be programmed based on a configured normalization setting for processors in a set of processing devices. In various embodiments, the programmable weights can be set to a default value for each of a set of devices, or can be programmed on a per-processor basis based on the specifically determined operating parameters for each processor.

For example, due to slight differences between processors that arise during the manufacturing process, some processors in some devices may be operationally stable at slightly lower operating voltages. A lower stable operating voltage enables the processor to operate in a slightly more power efficient manner relative to other processors. Other processors may require a slightly higher operating voltage for stable operation, while still operating within manufacturing tolerances. Operations for these processors may be slightly less power efficient. The precise operating parameters for each processor can be determined during the final manufacturing steps of the processor. These operating parameters can be associated with a per-processor identifier 425 that can be written to programmable read only memory (e.g., fusible link memory) within a processor (e.g., processor 428A). Each processor or accelerator in the CPU complex can include such identifier information.

In one embodiment the specific, fine-tuned operating parameters (e.g., stable operating voltage) for the processor 428A can be written with the per-processor identifier 425. The parameters can also be determined by initialization logic associated with the digital power estimator 420. The programmable weights 422 within the digital power estimator 420 can be adjusted by power management logic on a per-processor basis. As the digital power estimator 420, in one embodiment, performs power estimation based on input from multiple processors in the CPU complex 410, multiple sets of programmable weights 422 may be programmed, where each processor has an associated set of weights. The initialization logic for the digital power estimator 420 is illustrated in further detail in FIG. 8.

Efficiency Control System

Figure 5:
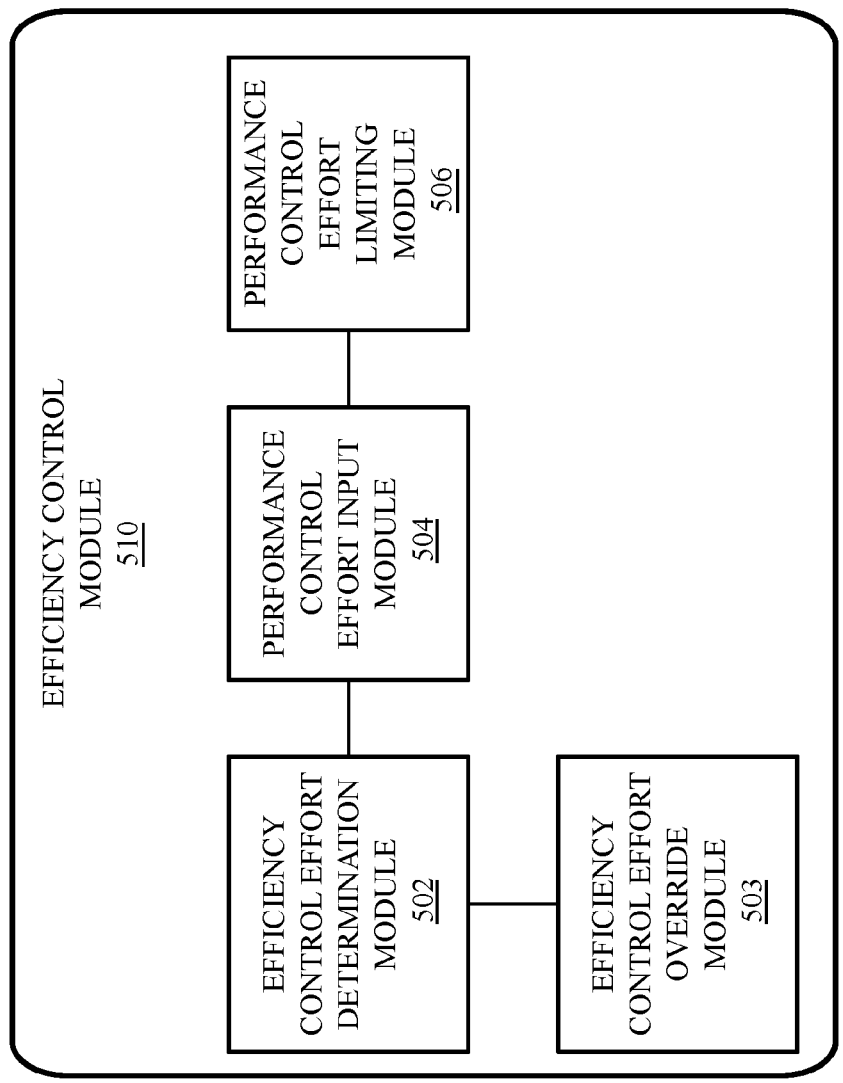
FIG. 5 is a block diagram of an overview of an efficiency control system, according to an embodiment.

FIG. 5 is a block diagram of an overview of an efficiency control system 500, according to an embodiment. In one embodiment the efficiency control system 500 for a data processing system includes an efficiency control module 510, which can be integrated within the efficiency controller 214 of FIG. 2 or the efficiency controller 314 of FIG. 3. In such embodiment, the efficiency control module 510 includes an efficiency control effort determination module 502, a efficiency control effort override module 503, a performance control effort input module 504, and a performance control effort limiting module 506.

The efficiency control effort determination module 502 can be configured to determine an efficiency control effort to be applied to a processing system based on the current processing efficiency of the system. In one embodiment this processing efficiency is determined as a measurement of energy consumed per instruction. The efficiency control effort determination module 502 can receive energy consumption estimates from a digital power estimator, such as the digital power estimator 320 of FIG. 3 or the digital power estimator 420 of FIG. 4. The energy consumption estimates can be analyzed in light of instruction rate metrics reported by a processor or a group of processors.

One embodiment enables the efficiency control effort to be temporarily overridden by the efficiency control effort override module 503. Based on input from the efficiency control effort override module 503, the efficiency control effort can be reduced without regard to the currently determined operational efficiency of the processor. When input from the efficiency control effort override module 503 ceases, the efficiency control effort determination module 502 can begin to adjust the efficiency control efforts based on determined operational efficiency.

In one embodiment the efficiency control effort determined by the efficiency control effort determination module 502 is used to adjust a performance control effort determined by a performance control module, for example, included within the performance controller 216 of FIG. 2 or the performance controller 316 of FIG. 3. The performance control effort from the performance controller can be received via the performance control effort input module 504, which can be configured to receive a stream of performance control effort adjustments from the performance control module. The efficiency control module 510 can then adjust the performance control effort via the performance control effort limiting module 506, which reduces the performance control effort by an amount determined by the efficiency control effort computed by the efficiency control effort determination module 502. This reduction in the performance control effort limits an increase in performance that would otherwise result from a given performance control effort. In one embodiment, reducing the performance control effort results in a reduction in a number of processors within a CPU complex (e.g., CPU complex 310 of FIG. 3, CPU complex 410 of FIG. 4) that are enabled or are to be enabled to process a given workload. In one embodiment, reducing the performance control effort limits the ability of a specific processor to enter the highest possible frequencies for the processor. In such embodiment, a limited processor will be allowed to reach maximum frequency unless the processor is executing a workload having an efficiency metric (e.g., energy consumed per instruction) below a threshold, unless the efficiency control effort override module 503 is in effect.

Figure 6:
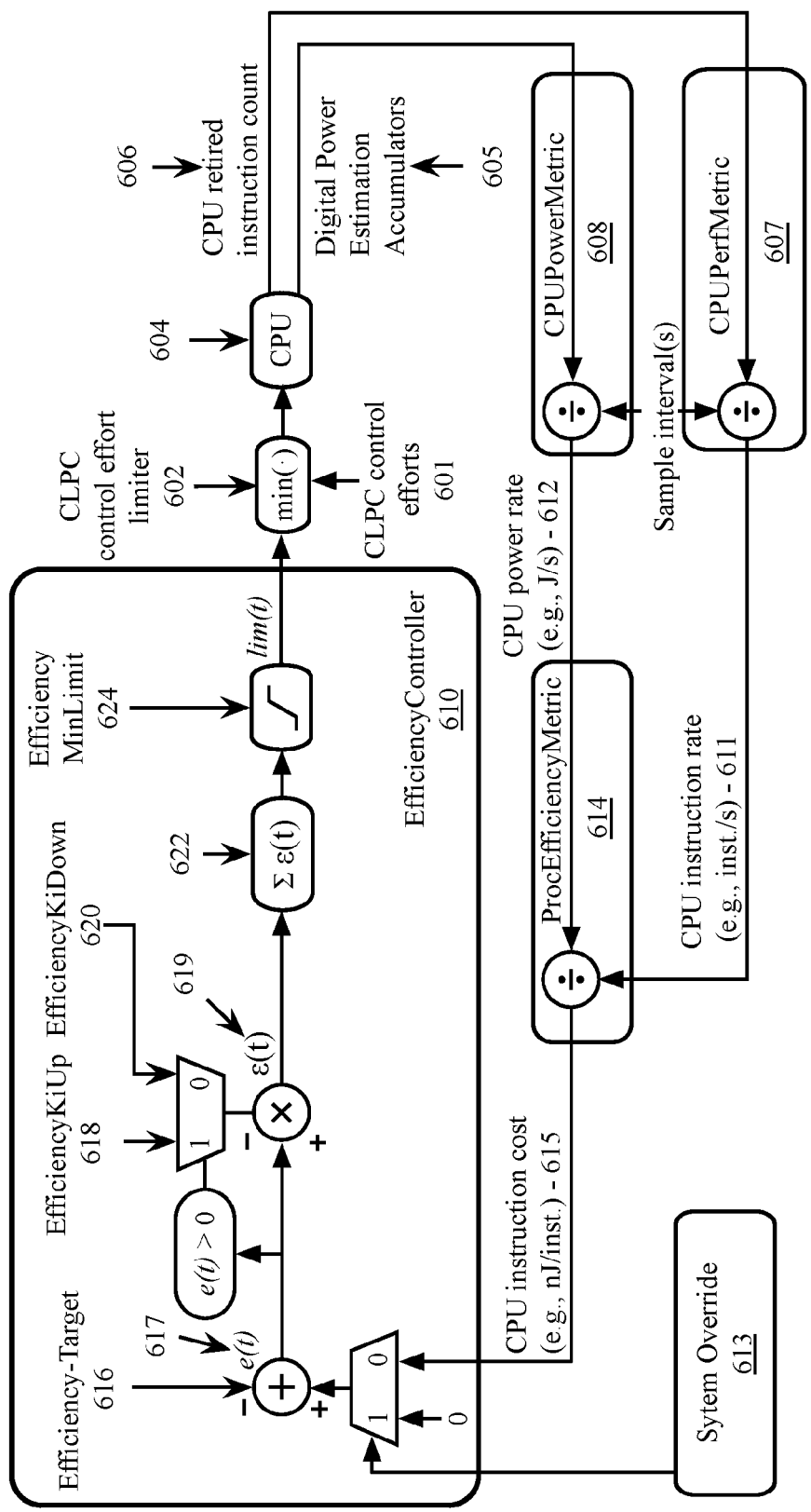
FIG. 6 is a block diagram of an efficiency control system, according to an embodiment.

FIG. 6 is a block diagram of an efficiency control system 600, according to an embodiment. One embodiment provides for an efficiency control system including an efficiency controller 610 in communication with a performance controller and a CPU 604. In such embodiment, the efficiency control system 600 is configured to limit the control effort requested by a closed loop performance controller (CLPC), which is a performance controller in closed loop communication with a scheduler, for example, the performance controller 216 and scheduler 212 as in FIG. 2. Based on scheduler dispatch latency and current power and performance metrics of a processing system, the CLPC can compute a set of CLPC control efforts 601 for a processing subsystem and those control efforts can be limited (e.g., reduced) by a CLPC control effort limiter 602 based on a current efficiency effort computed by the efficiency controller 610.

The precise mathematical relationship between the efficiency control effort and the performance control effort can vary. In one embodiment the efficiency control effort can vary between zero and one and is multiplied by the CLPC control efforts 601, such that a lower efficiency control effort reduces the performance control effort applied for the CPU 604. However, alternate approaches may be used. In one embodiment the efficiency control effort can be subtracted from the CLPC control efforts 601, such that higher efficiency control efforts further reduce the performance control effort applied for the CPU 604.

The limited control efforts can then be applied to the CPU 604. In various embodiments the CPU 604 can be a single processor, a multi-processor CPU complex as in FIG. 3 and FIG. 4, or a specific processor or processor core within a multi-processor CPU complex. The CLPC control efforts 601 set a target performance level for the CPU 604 which, in various embodiments, the CPU can realized by increasing the number of active processors or processor cores or increasing the voltage and/or frequency of the active processors or of a specific active processor. The CLPC control effort limiter 602 reduces the CLPC control efforts 601, which depending on the current operational parameters (e.g., voltage, frequency, etc.) of one or more processors or processor cores of the CPU, can result in a reduction in the amount in which the target performance level is increased or an reduction in the target performance level to a lower target performance level.

For example, application of the CLPC control effort limiter 602 to reduce the CLPC control efforts 601 can result in a frequency of the CPU 604 being set to a lower frequency than originally requested by the CLPC control efforts 601, or result in the activation of a fewer number of processors than indicated by the CLPC control efforts 601. In one embodiment, the CLPC control effort limiter 602 can override the CLPC control efforts 601, such requests to increase the target performance level of the CPU 604 are ignored, for example, due to the poor energy efficiency of the currently operating workload.

The efficiency controller 610 can determine an efficiency control effort that is applied by the CLPC control effort limiter 602. The control effort can be determined based on a set of power and performance data provided by the CPU 604 (or CPU complex). In one embodiment the set of power and performance data includes a CPU retired instruction count 606 and data from digital power estimation accumulators 605, such as the power estimate 424 of FIG. 4. The power and performance data provided by the CPU 604 can be used to generate power and performance metrics that are analyzed by the efficiency controller 610. For example, a CPU power metric 608 (CPUPowerMetric) can be generated based on the data from the digital power estimator accumulators 605. A CPU performance metric 607 (CPU PerfMetric) can be generated based on the CPU retired instruction count.

In one embodiment the CPU power and performance metrics are sampled at a pre-defined or variable sample interval. The CPU power metric can be divided by the current sample interval to produce a CPU power rate 612. The CPU performance metric can be divided by the current sample interval to produce a CPU instruction rate 611. In one embodiment the CPU power rate 612 is provided in joules per second and the CPU instruction rate is provided by instructions per second, although other measurements may be used. The CPU power rate 612 of the CPU power metric can be divided by the CPU instruction rate of the CPU performance metric to produce a processor efficiency metric 614 (ProcEfficiencyMetric), which can be in the form of a CPU instruction cost 615 (e.g., nanojoules per instruction). The CPU instruction cost 615 is provided to the efficiency controller 610.

In one embodiment the CPU instruction cost 615 input is gated by a system override 613. Activating the system override 613 causes the efficiency controller 610 to read a zero instruction cost instead of the actual CPU instruction 615. The system override 613 can be activated under certain circumstances when the power and performance management logic of the data processing system determines that the efficiency limits should be bypassed, at least in part, for a period of time. For example, the system override 613 can be activated when the system is performing SIMD operations in which a large amount of data is processed per instruction.

The CPU instruction cost 615 (or zero if the system override 613 is enabled) can be compared with an efficiency target 616 to determine an efficiency error e at time t. For example, and in one embodiment with a system determined efficiency target of X instruction cost and a current computed instruction cost of Y, the efficiency error at time t (e.g., current efficiency error e(t) 617) is e(t)=Y−X, resulting in a positive current efficiency error e(t) when the computed instruction cost Y exceeds the efficiency target 616 and a negative current efficiency error e(t) when the computed instruction cost is less than the efficiency target 616.

The current efficiency error e(t) 617 is selectively multiplied by one of a pair of efficiency control tuning values (efficiencyKiUP 618 and efficiencyKiDown 620) depending on whether the current efficiency error e(t) 617 is above or below the efficiency target 616. Separate efficiency control tuning values enable differing attack and release rates for winding up or winding down the efficiency control effort. For example, the efficiency controller 610 can be configured to tune the rate of adjustment of the efficiency control effort during periods of inefficient operation and separately tune the adjustment of the efficiency control effort during periods of efficient operation. The current efficiency error e(t) 617 is multiplied by the selected efficiency control tuning value to produce an efficiency scale factor ε(t) 619.

In one embodiment an efficiency scale factor sum 622 is generated based on a window of recent values of the efficiency scale factor ε(t) 619, such that historical values can be combined with recent values when determining the efficiency control value to be used by the CLPC control effort limiter 602. In one embodiment a minimum efficiency limit (efficiencyMinLimit 624) filter can be applied when generating the efficiency control value, such that a minimum efficiency floor can be set for the system. In one embodiment, the minimum efficiency floor is associated with a maximum frequency and/or voltage in which the CPU 604 will be allowed to operate, even when the efficiency target 616 is being met. In one embodiment, instead of the minimum efficiency floor, the minimum efficiency limit is a soft limit beyond which increased reductions in processor efficiency are allowed but aggressively resisted.

Once an efficiency control effort has been computed for a control period, the efficiency control effort can be provided to the CLPC control effort limiter 602 to limit an incoming set of CLPC control efforts 601. The computed efficiency control effort can be used to determine the limiting factor that is applied to the CLPC control efforts 601. The efficiency control system 600 can continue to operate in the cyclical manner described herein for the duration of system operation.

Efficiency Control Logic

Figure 7:
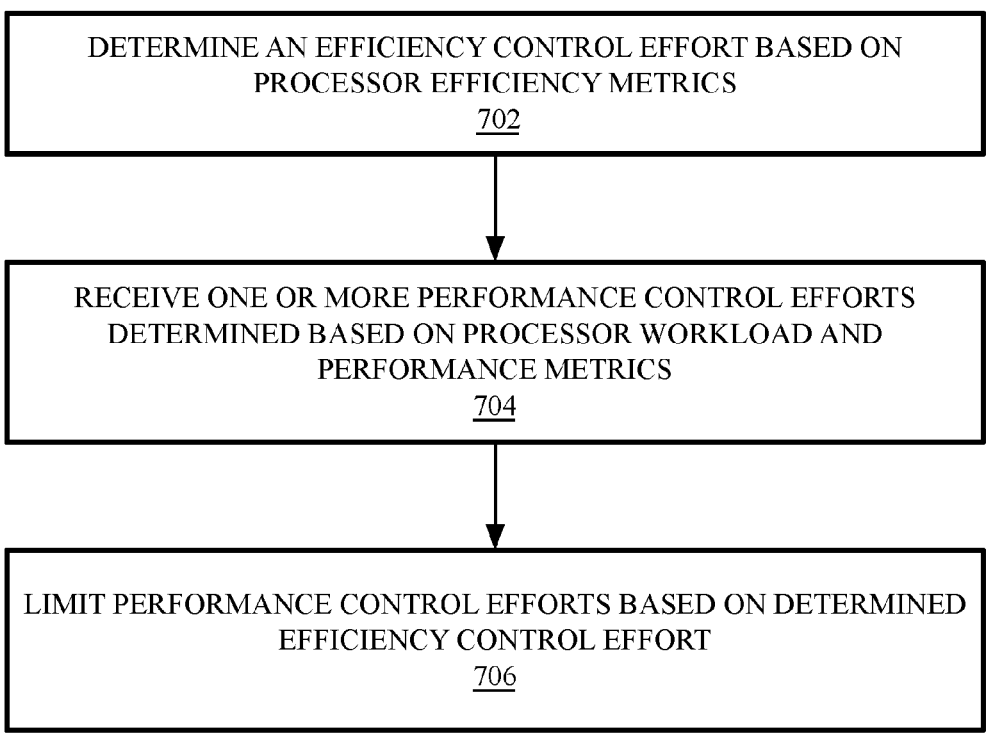
FIG. 7 is flow diagram illustrating an overview of efficiency control logic, according to an embodiment.

FIG. 7 is flow diagram illustrating an overview of efficiency control logic 700, according to an embodiment. The efficiency control logic 700 can be implemented by the modules of the efficiency control system 500 of FIG. 5 or the efficiency control system 600 of FIG. 6. Such modules and/or systems, in one embodiment, reside in an efficiency controller 214 as in FIG. 2. In one embodiment efficiency controller logic can reside within a power state controller, as illustrated with respect to the efficiency controller 314 and power state controller 330 as in FIG. 3. The efficiency control logic 700 can determine an efficiency control effort based on processor efficiency metrics, as shown at 702.

The efficiency control logic 700 can receive one or more performance control efforts determined based on processor workload and performance metrics 704. The one or more performance control efforts can be determined and provided by a performance controller described herein, such as a closed loop performance controller (e.g., performance controller 216) as in FIG. 2. The control efforts can be provided in a manner similar to the CLPC control efforts 601 as in FIG. 6.

Based on the efficiency control efforts determined at 702, the efficiency control logic 700 can limit performance control efforts based on the determined efficiency control effort, as shown at 706. The processor efficiency metrics used to determine the efficiency control efforts are determined at least in part based on data received from digital power estimation logic described herein (e.g., digital power estimator 320 as in FIG. 3, digital power estimator 420 as in FIG. 4), which estimates processor power consumption during instruction execution. In one embodiment the power estimates provided by the digital power estimation logic can be tuned based on programmable weights, which may be configured, for example, during initialization of the digital power estimation logic.

Figure 8:
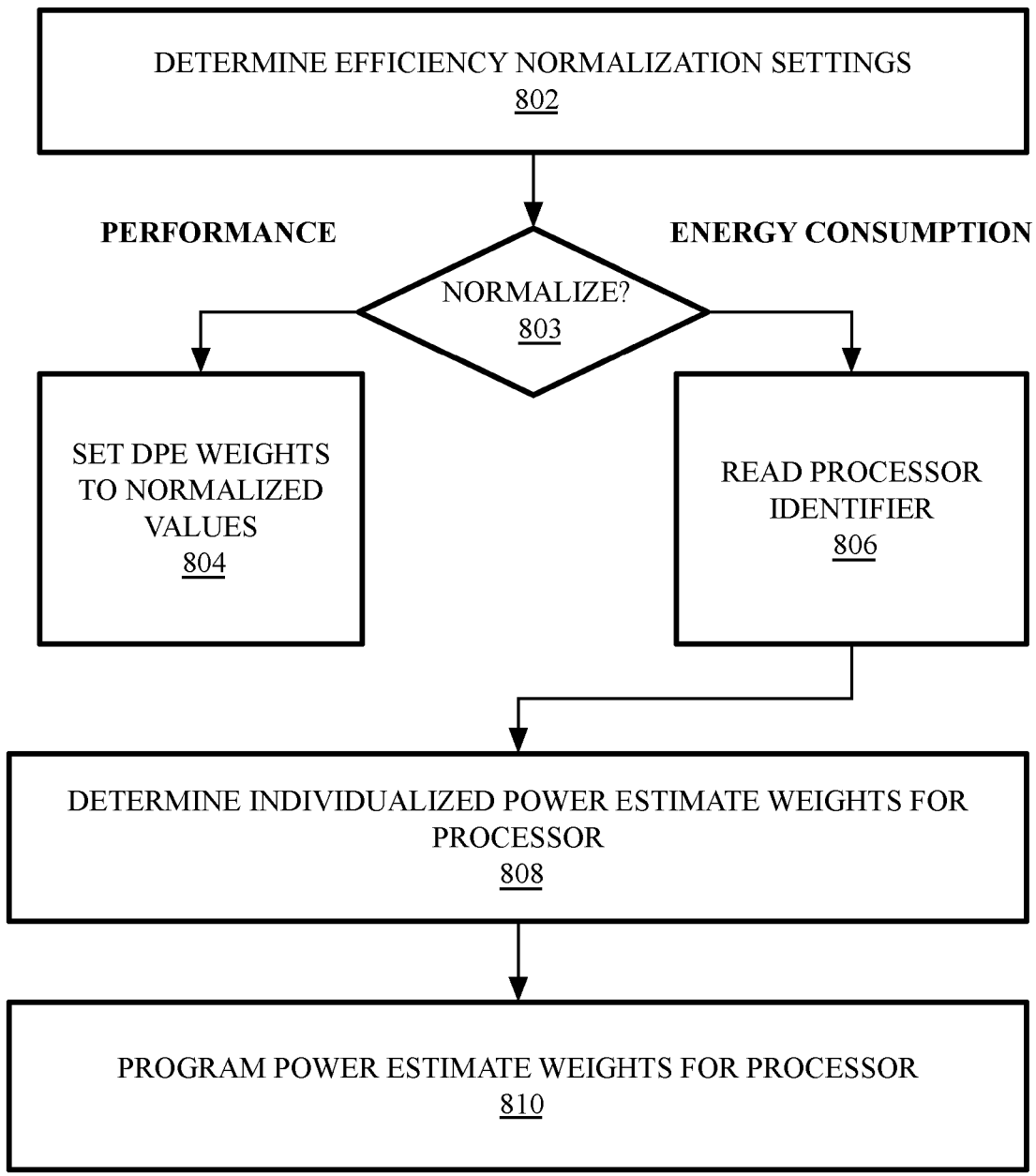
FIG. 8 is a flow diagram of digital power estimator initialization logic, according to an embodiment.

FIG. 8 is a flow diagram of digital power estimator initialization logic 800, according to an embodiment. The digital power estimator initialization logic 800 can initialize the digital power estimator based on an efficiency normalization policy configured for a set of electronic devices. The normalization policy can determine, for example, how to program a set of programmable weights, such as the programmable weights 422 of FIG. 4.

If the programmable weights of the digital power estimator are set to the same default value for each device, different devices may show small variations in device-to-device energy consumption, as the differences in device-to-device energy consumption can vary based on slightly different stable operating voltages across efficiency controlled processors of the differing devices. However, the processing performance will be normalized across the set of devices. Alternatively, precise values for the weights can be determined on a processor-by-processor basis during processor manufacturing. Using the per-processor values, slight differences in processing performance may arise across a set of devices, but the energy consumption will be normalized across the set of devices.

In one embodiment the digital power estimator initialization logic 800 can be performed by software driver logic. In one embodiment the digital power estimator initialization logic 800 can be performed by firmware logic based on configured firmware settings.

Based on software or firmware configuration data, the digital power estimator initialization logic 800, can determine the configured efficiency normalization settings at 802. Based on those settings the logic can determine whether a device is to be normalized based on performance or energy consumption, as shown at 803. To normalize based on performance, the digital power estimator (DPE) weights can be set to normalized values, at 804 and each device in the set of devices will exhibit the same or substantially similar performance while having varying energy consumption and, for mobile devices, the same or substantially similar battery performance. In one embodiment, setting the digital power estimator weights to normalized values may set different values for different weights within a single electronic device, but the same set of values are used to initialize each device in a set of devices.

Alternatively, the digital power estimator initialization logic 800 can be configured to normalize the energy consumption of the set of devices, such that slight performance variations may arise, but the set of devices will have the same or substantially the same energy consumption and, for mobile devices, the same or substantially similar battery performance. If the efficiency normalization settings determined at 802 indicate to normalize based on energy consumption, the digital power estimator initialization logic 800 can read a processor identifier for an associated processor at 806. Using the processor identifier, the digital power estimator initialization logic 800 can determine a set of individualized power estimate weights for the processor at 808. In one embodiment the power estimate rates for a set of processor identifiers can be stored in a database and the power estimate weights can be retrieved based on the processor identifier. In one embodiment the power estimate weights can be stored with the processor identifier. In one embodiment the power estimate weights can be derived from the processor identifier. Once the power estimate weights are determined at 808, the digital power estimator initialization logic 800 can program the power estimate weights for the processor at 810.

Figure 9:
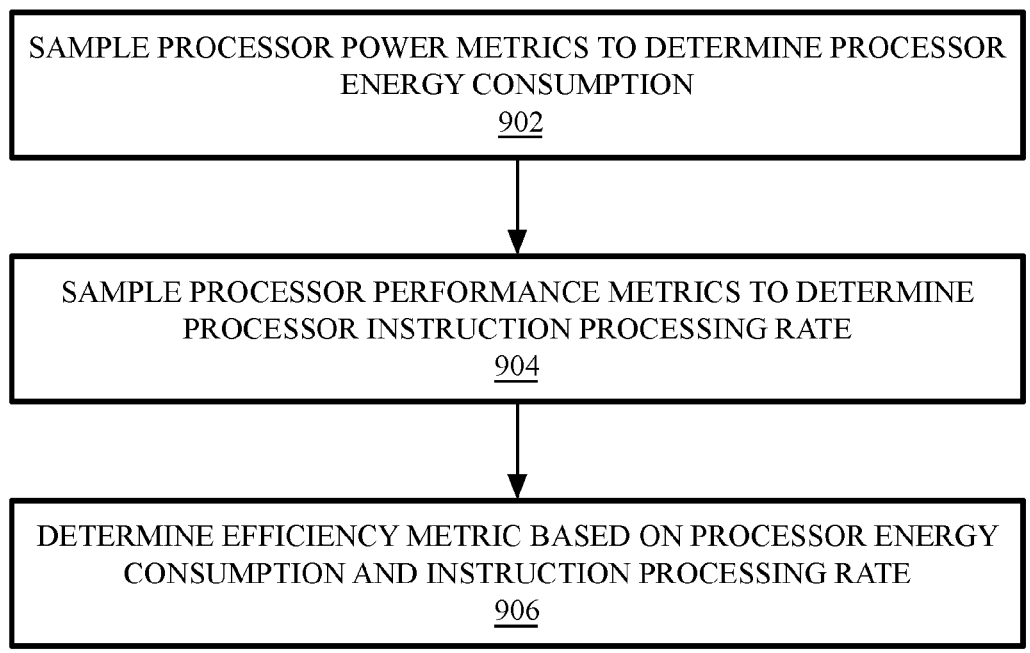
FIG. 9 is a flow diagram of efficiency metric determination logic, according to an embodiment.

FIG. 9 is a flow diagram of efficiency metric determination logic 900, according to an embodiment. The efficiency metric determination logic 900 can be performed by logic associated with the efficiency control system 600 of FIG. 6 and/or the efficiency control effort determination module 502 of FIG. 5.

In one embodiment the efficiency metric determination logic 900 can sample processor power metrics to determine processor energy consumption, as shown at 902. For example, the efficiency metric determination logic 900 can determine a CPU power metric 608 based on digital power estimation accumulators 605, as illustrated in FIG. 6.

In one embodiment the efficiency metric determination logic 900 can sample processor performance metrics to determine processor instruction processing rate, as shown at 904. For example, the efficiency metric determination logic 900 can determine a CPU performance metric 607 based on a CPU retried instruction count 606, as illustrated in FIG. 6.

Using the processor energy consumption and instruction processing rate, the efficiency metric determination logic 900 can determine an efficiency metric based on the processor energy consumption and instruction processing rate, as shown at 906. For example and in one embodiment the efficiency metric can be determined as with the processor efficiency metric 614 of FIG. 6.

Figure 10:
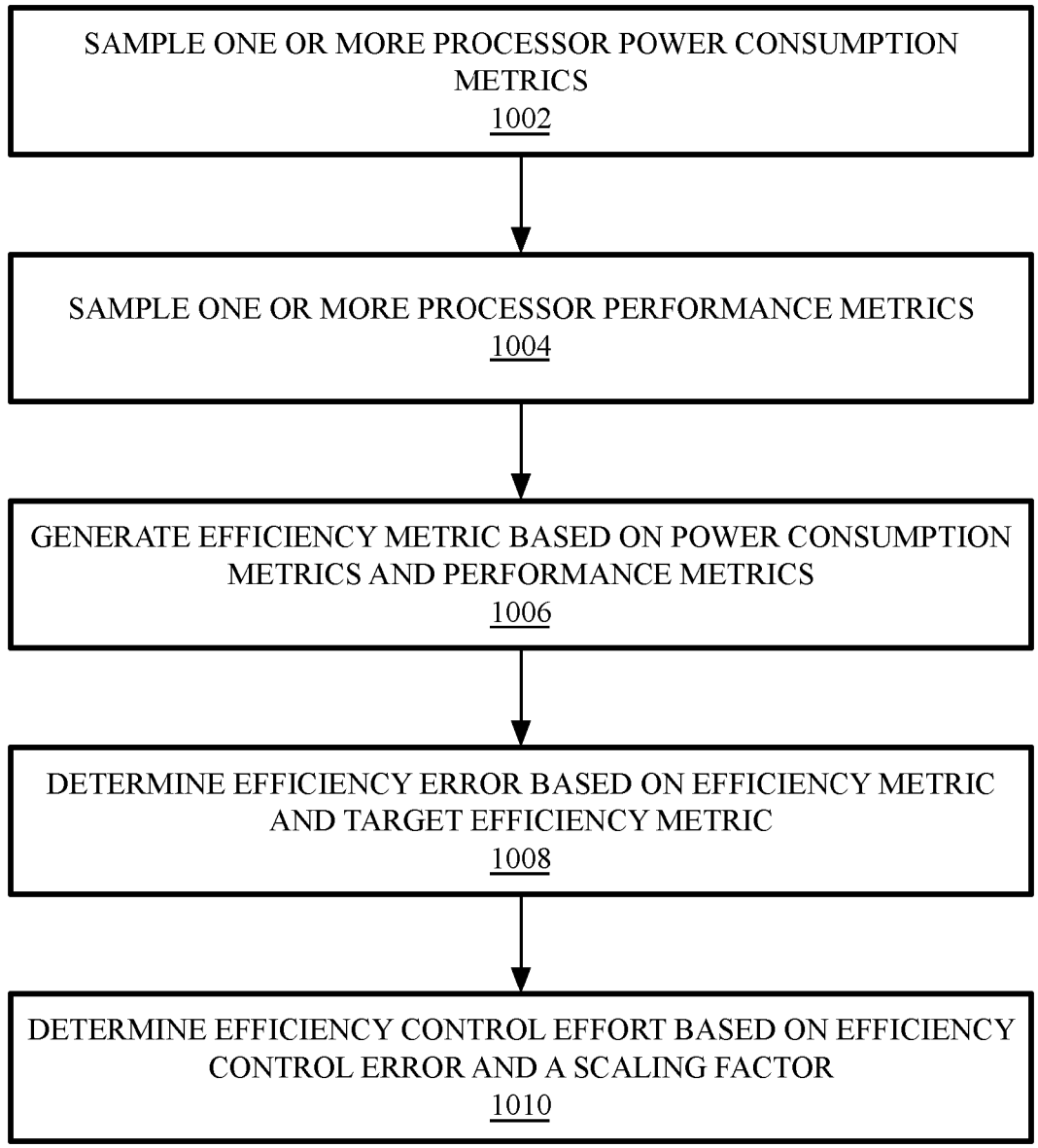
FIG. 10 is a flow diagram of efficiency control effort determination logic 1000, according to an embodiment.

FIG. 10 is a flow diagram of efficiency control effort determination logic 1000, according to an embodiment. Efficiency control effort determination logic 1000 can be performed by any of the efficiency controllers or modules described herein. In one embodiment the efficiency control effort determination logic 1000 can incorporate the efficiency metric determination logic 900 of FIG. 9 to sample one or more processor power consumption metrics at 1002 and sample one or more processor performance metrics at 1004. Alternatively, the efficiency control effort determination logic 1000 can include separate metric sampling logic. Example sampled metrics include a CPU power rate 612 and CPU instruction rate 611 as in FIG. 6.

The efficiency control effort determination logic 1000 can further generate an efficiency metric based on the power consumption metrics and performance metrics, as shown at 1006. An example efficiency metric is the CPU instruction cost 615 as in FIG. 6. The efficiency control effort determination logic 1000 can then determine an efficiency error based on the efficiency metric and a target efficiency metric, as shown at 1008. The efficiency control effort determination logic 1000 can then determine an efficiency control effort based on the efficiency error and a scaling factor, as shown at 1010.

Figure 11:
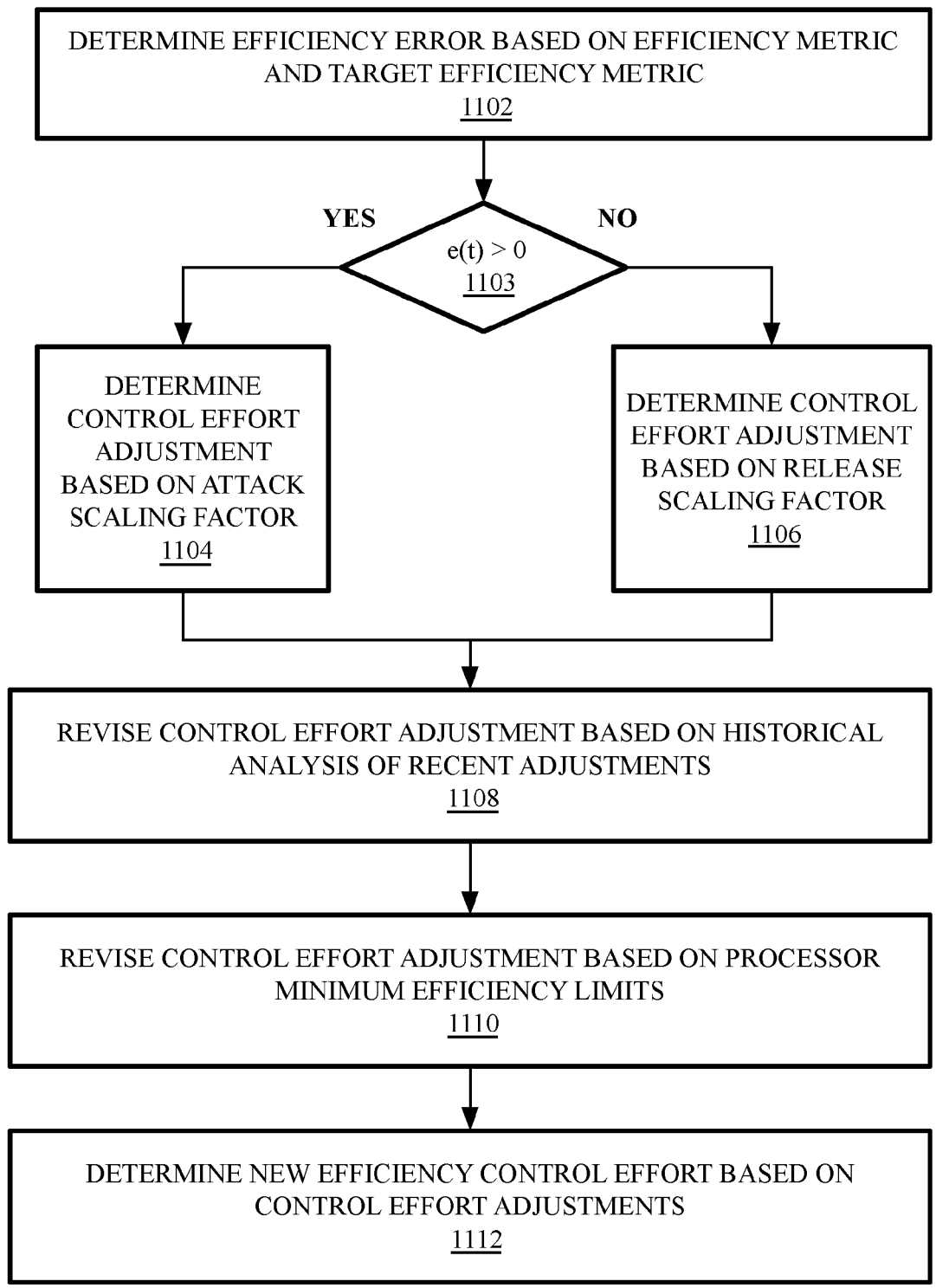
FIG. 11 is an additional flow diagram of efficiency control effort determination logic, according to an embodiment.

FIG. 11 is an additional flow diagram of efficiency control effort determination logic 1100, according to an embodiment. In one embodiment the efficiency control effort determination logic 1100 can enable an efficiency controller to determine an efficiency error based on an efficiency metric and a target efficiency metric at 1102. The efficiency control effort determination logic 1100 can determine whether the efficiency error is greater than zero (e(t)>0). As shown at 1103, based on the efficiency error, the efficiency control effort determination logic 1100 can determine a control effort adjustment based on an attack scaling factor at 1104, or determine a control effort adjustment based on a release scaling factor at 1106. Separate and independently adjustable efficiency control tuning values (e.g., efficiencyKiUP 618 and efficiencyKiDown 620 as in FIG. 6) enable differing attack and release rates for winding up or winding down the efficiency control effort such that the efficiency control effort determination logic 1100 can be configured to tune the rate of adjustment of the efficiency control effort during periods of inefficient operation and separately tune the adjustment of the efficiency control effort during periods of efficient operation. Additionally, where an embodiment includes a system override input (e.g., system override 613 of FIG. 6), the system override input can also temporarily cause the efficiency control effort determination logic 1100 to adjust the control effort based on the release scaling factor.

In one embodiment the efficiency control effort determination logic 1100 can further revise the control effort adjustment based on historical analysis of recent adjustments at 1108. For example, where a larger degree of efficiency control has been recently applied to limit increases in processor performance level, the control effort may be adjusted to release control efforts more slowly or limit more aggressively. Alternatively, where recent application of efficiency control efforts has been limited, the efficiency control effort determination logic 1100 may release more rapidly or attack less aggressively.

In one embodiment the efficiency control effort determination logic 1100 can further revise the control effort adjustment based on processor minimum efficiency limits, as shown at 1110. The processor minimum efficiency limits define an efficiency floor for the processor, such that, previous efficiency control effort determinations notwithstanding, the processor can be prevented from operating beyond a determined minimum efficiency. In one embodiment, one or more minimum efficiency limits can be associated with a specific operational frequency of the processor, which may be less than the maximum possible frequency or maximum possible level of performance that may be attained by a processor or CPU complex. In one embodiment, instead of the minimum efficiency floor, the minimum efficiency limit is a soft limit beyond which increased reductions in processor efficiency are allowed but aggressively resisted.

The efficiency control effort determination logic 1100 can then determine a new efficiency control effort based on the collected control effort adjustments, as shown at 1112. The final control effort can be provided to a performance control effort limiter, for example, the CLPC control effort limiter 602 as in FIG. 6, to limit the set of performance control efforts provided by the processor performance controller before the performance control effort is applied for the processor.

Figure 12:
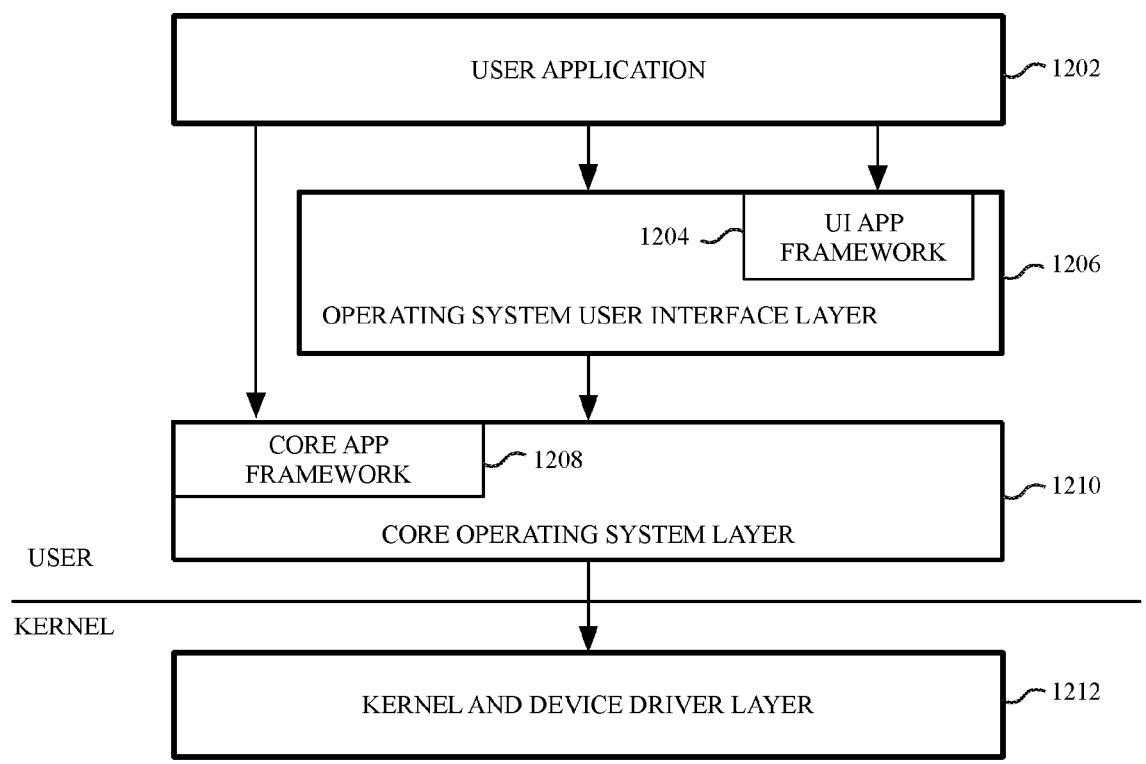
FIG. 12 is a block diagram illustrating a multi-layer software architecture used by a data processing system, according to an embodiment.

FIG. 12 is a block diagram illustrating a multi-layer software architecture 1200 used by a data processing system, according to an embodiment. The software components are illustrated with a division between user space and a kernel space. Although other arrangements are possible, user applications (e.g., user application 1202), and some operating system components (e.g., operating system user interface layer 1206, and the core operating system layer 1210) execute in user space. In kernel space, the operating system kernel and a set of device drivers operate in the kernel and device driver layer 1212. The kernel and device driver layer 1212 manage the underlying functionality of the overall operating system and provide a formalized and secure mechanism for user space software to access data processing system hardware.

A user interface (UI) application framework 1204 provides a mechanism for the user application 1202 to access UI services provided by the operating system (OS) UI layer 1206. Underlying operating system functions that are not related to the user interface can be performed in the core operating system layer 1210. One or more data management frameworks, such as a core app framework 1208 can be made available to a user application to facilitate access to operating system functions.

The user application 1202 may be any one of a plurality of user applications. Each user application 1202 can include one or more processes or tasks, which may spawn multiple threads. The user application 1202 can access instructions in an exemplary UI app framework 1204 for creating and drawing graphical user interface objects such as icons, buttons, windows, dialogs, controls, menus, and other user interface elements. The UI application framework 1204 also provides additional functionality including menu management, window management, and document management, as well as file open and save dialogs, drag-and-drop, and copy-and-paste handling.

The core operating system layer 1210 contains operating system components that implement features including and related to application security, system configuration, graphics and media hardware acceleration, and directory services. Multiple application frameworks, including the core app framework 1208, provide a set of APIs to enable a user application 1202 to access core services that are essential to the application, but are not directly related to the user interface of the application. The core app framework 1208 can facilitate an application's access to database services, credential and security services, backup services, data synchronization services, and other underlying functionality that may be useful to an application.

The core app framework 1208, or equivalent application frameworks, can provide access to remote server based storage for functionality including synchronized document storage, key-value storage, and database services. Key-value storage allows a user application 1202 to share small amounts of data such as user preferences or bookmarks among multiple instances of the user application 1202 across multiple client devices. The user application 1202 can also access server-based, multi-device database solutions via the core app framework 1208.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 13:
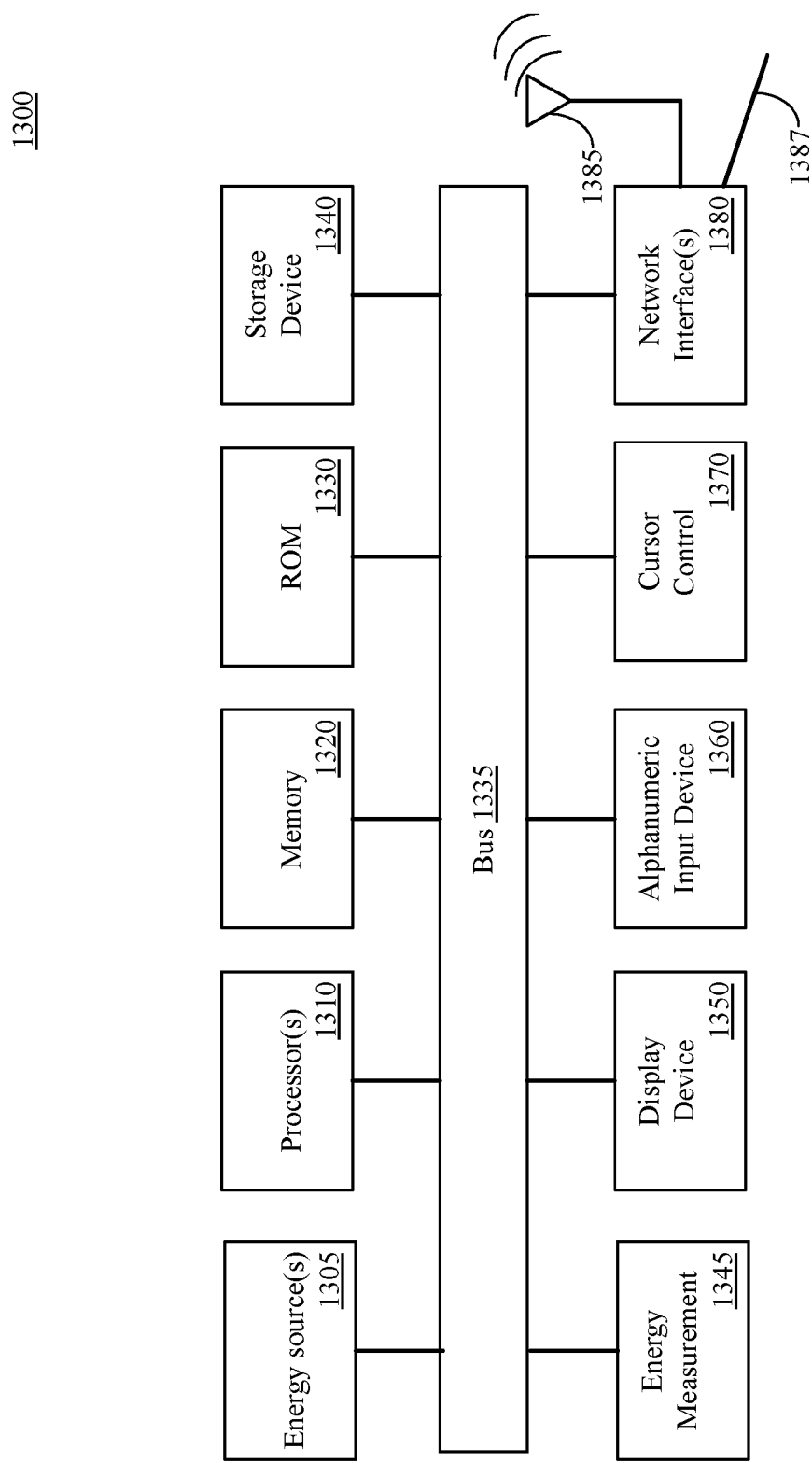
FIG. 13 is a block diagram of a computing system, according to an embodiment.

FIG. 13 is a block diagram of a computing system 1300, according to an embodiment. The computing system illustrated in FIG. 13 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 13 may be used to provide the computing device and/or the server device.

Computing system 1300 includes bus 1335 or other communication device to communicate information, and processor(s) 1310 coupled to bus 1335 that may process information.

While computing system 1300 is illustrated with a single processor, computing system 1300 may include multiple processor(s) 1310, including one or more co-processors. Computing system 1300 further may include main memory 1320 in the form of random access memory (RAM) or other dynamic storage device coupled to bus 1335 and may store information and instructions that may be executed by processor(s) 1310. Main memory 1320 may also be used to store temporary variables or other intermediate information during execution of instructions by processor(s) 1310.

Computing system 1300 may also include read only memory (ROM) 1330 and/or another data storage device 1340 coupled to bus 1335, which can store data and instructions for use by the processor(s) 1310. Data storage device 1340 may be coupled to bus 1335 to store information and instructions. Data storage device 1340 such as flash memory or a magnetic disk or optical disc and corresponding drive may be coupled to computing system 1300.

Computing system 1300 may also be coupled via bus 1335 to display device 1350, such as a cathode ray tube (CRT), a liquid crystal display (LCD), or a light emitting diode (LED) display, to display information to a user. Computing system 1300 can also include an alphanumeric input device 1360, including alphanumeric and other keys, which may be coupled to bus 1335 to communicate information and command selections to processor(s) 1310. Another type of user input device is cursor control 1370, such as a touchpad, a mouse, a trackball, or cursor direction keys to communicate direction information and command selections to processor(s) 1310 and to control cursor movement on display device 1350. Computing system 1300 may also receive user input from a remote device that is communicatively coupled to computing system 1300 via one or more network interface(s) 1380.

Computing system 1300 further may include one or more network interface(s) 1380 to provide access to a network, such as a local area network. Network interface(s) 1380 may include, for example, a wireless network interface having antenna 1385, which may represent one or more antenna(e). Computing system 1300 can include multiple wireless network interfaces such as a combination of WiFi, Bluetooth®, near field communication (NFC), and/or cellular telephony interfaces. Network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, network interface(s) 1380 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Computing system 1300 can further include one or more energy sources 1305 and an one or more energy measurement systems 1345. Energy sources 1305 can include an AC/DC adapter coupled to an external power source, one or more batteries, one or more charge storage devices, a USB charger, or other energy source. Energy measurement systems include at least one voltage or amperage measuring device that can measure energy consumed by the computing system 1300 during a predetermined period of time. Additionally, one or more energy measurement systems can be included that measure, e.g., energy consumed by a display device, cooling subsystem, WiFi subsystem, or other frequently-used or high consumption subsystem.

Figure 14:
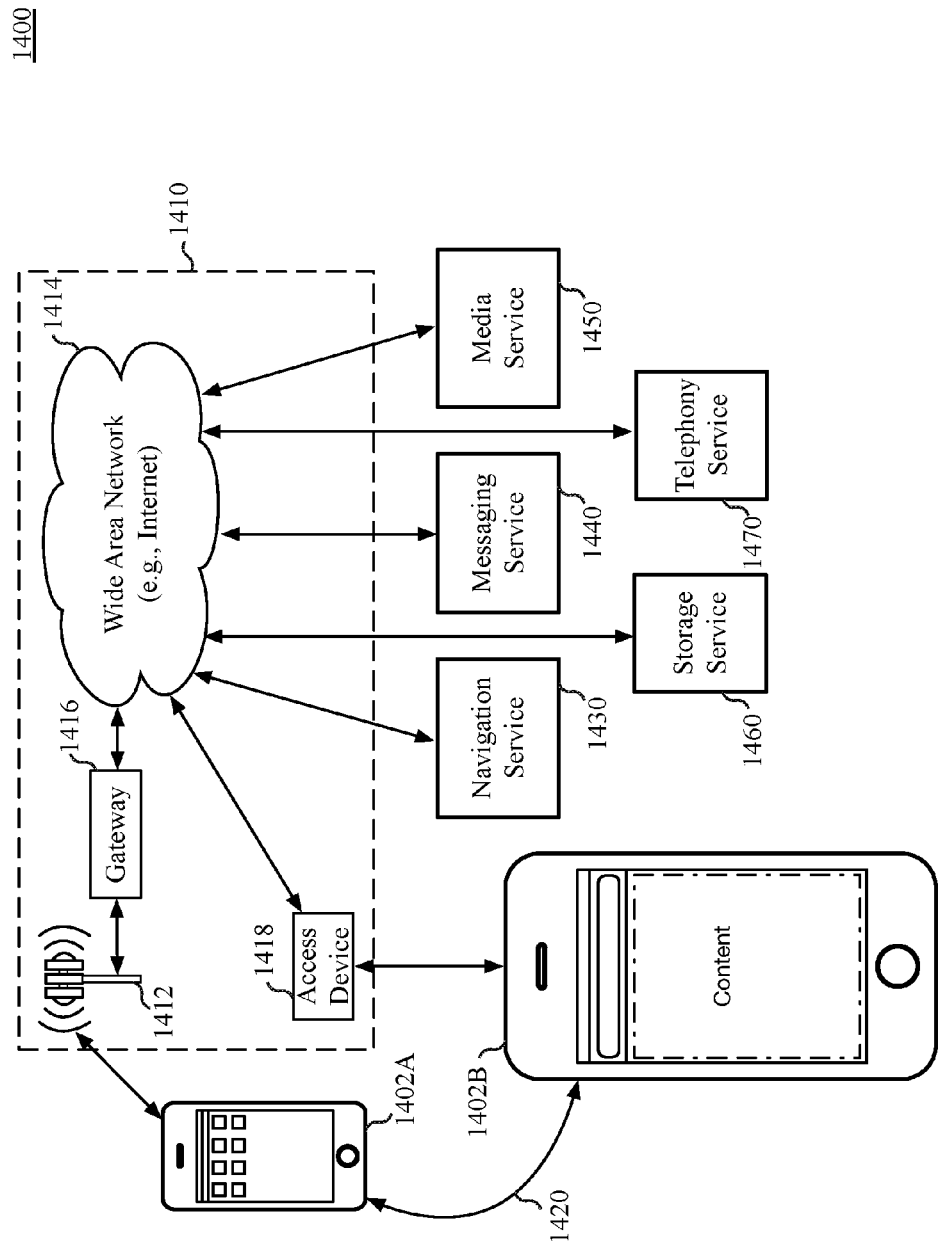
FIG. 14 is a block diagram of an example network operating environment for mobile devices, according to an embodiment.

FIG. 14 is a block diagram of an example network operating environment 1400 for mobile devices, according to an embodiment. Mobile device 1402A and mobile device 1402B can, for example, communicate over one or more wired and/or wireless networks 1410 to perform data communication. For example, a wireless network 1412, e.g., a cellular network, can communicate with a wide area network 1414, such as the Internet, by use of a gateway 1416. Likewise, an access device 1418, such as a mobile hotspot wireless access device, can provide communication access to the wide area network 1414.

In some implementations, both voice and data communications can be established over the wireless network 1412 and/or the access device 1418. For example, mobile device 1402A can place and receive phone calls (e.g., using VoIP protocols), send and receive e-mail messages (e.g., using POP3 protocol), and retrieve electronic documents and/or streams, such as web pages, photographs, and videos, over the wireless network 1412, gateway 1416, and wide area network 1414 (e.g., using TCP/IP or UDP protocols). In some implementations, mobile device 1402A can place and receive phone calls, send and receive e-mail messages, and retrieve electronic documents over the access device 1418 and the wide area network 1414. In some implementations, mobile device 1402A or mobile device 1402B can be physically connected to the access device 1418 using one or more cables and the access device 1418 can be a personal computer. In this configuration, mobile device 1402A or mobile device 1402B can be referred to as a "tethered" device.

Mobile device 1402A or mobile device 1402B can communicate with one or more services, such as a navigation service 1430, a messaging service 1440, a media service 1450, a storage service 1460, and a telephony service 1470 over the one or more wired and/or wireless networks 1410. For example, the navigation service 1430 can provide navigation information, e.g., map information, location information, route information, and other information. The messaging service 1440 can, for example, provide e-mail and/or other messaging services. The media service 1450 can, for example, provide access to media files, such as song files, audio books, movie files, video clips, and other media data. A storage service 1460 can provide network storage capabilities to mobile device 1402A and mobile device 1402B to store documents and media files. A telephony service 1470 can enable telephonic communication between mobile device 1402A and mobile device 1402B, or between a mobile device and a wired telephonic device. The telephony service 1470 can route voice over IP (VoIP) calls over the wide area network 1414 or can access a cellular voice network (e.g., wireless network 1412). Other services can also be provided, including a software update service to update operating system software or client software on the mobile devices.

Mobile device 1402A or 1402B can also access other data and content over the one or more wired and/or wireless networks 1410. For example, content publishers, such as news sites, RSS feeds, web sites, blogs, social networking sites, developer networks, etc., can be accessed via a web browser as described herein. For example, mobile device 1402A and/or mobile device 1402B can execute browser software to access web sites provided by servers accessible via the wide area network 1414.

Figure 15:
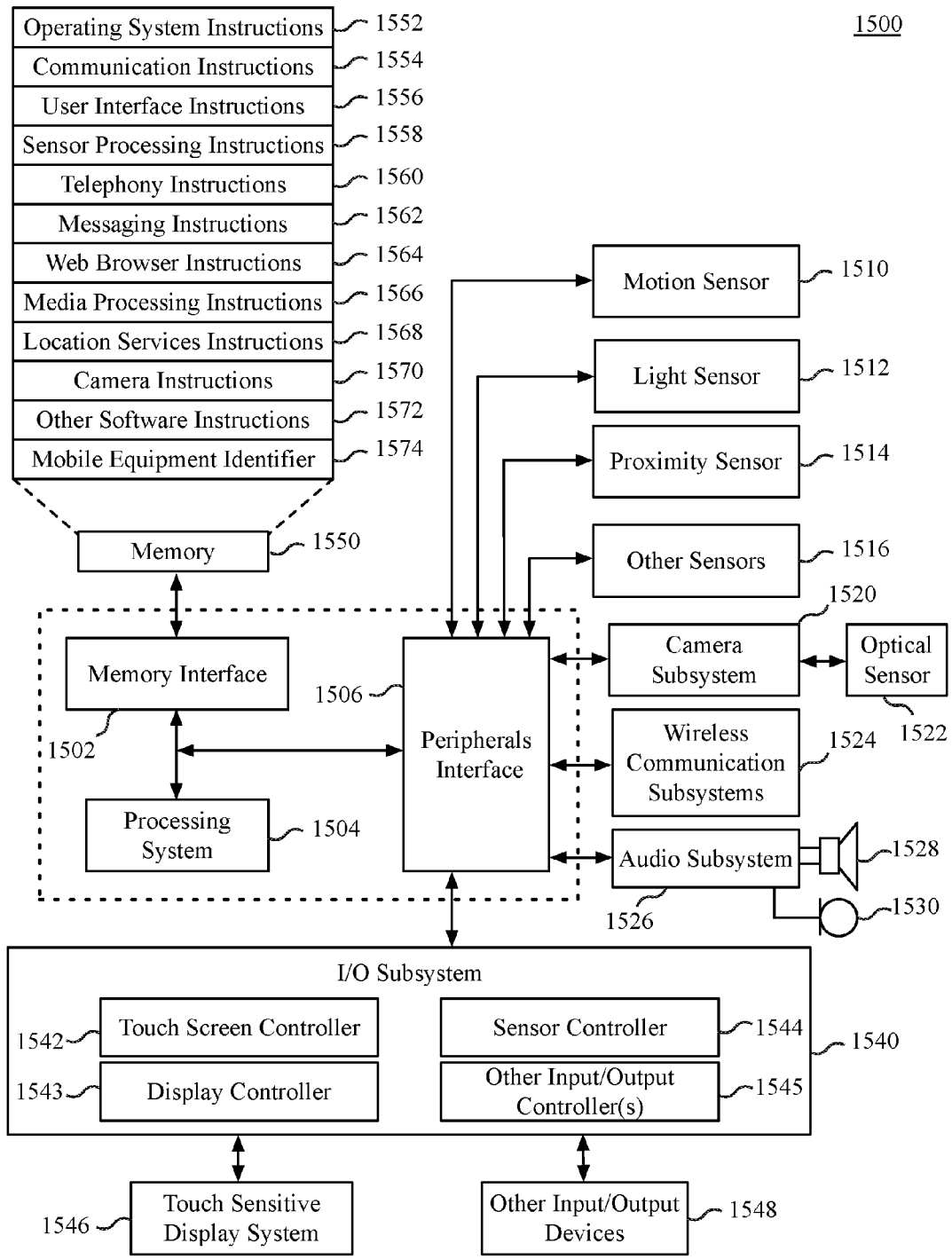
FIG. 15 is a block diagram of mobile device architecture, according to an embodiment.

FIG. 15 is a block diagram of mobile device architecture 1500, according to an embodiment. The mobile device architecture 1500 includes a include a memory interface 1502, a processing system 1504 including one or more data processors, image processors and/or graphics processing units, and a peripherals interface 1506. The various components can be coupled by one or more communication buses or signal lines. The various components can be separate logical components or devices or can be integrated in one or more integrated circuits, such as in a system on a chip integrated circuit.

The memory interface 1502 can be coupled to memory 1550, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 1506 to facilitate multiple functionalities. For example, a motion sensor 1510, a light sensor 1512, and a proximity sensor 1514 can be coupled to the peripherals interface 1506 to facilitate the mobile device functionality. Other sensors 1516 can also be connected to the peripherals interface 1506, such as a positioning system (e.g., GPS receiver), a temperature sensor, a biometric sensor, or other sensing device, to facilitate related functionalities. A camera subsystem 1520 and an optical sensor 1522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1524, which can include radio frequency receivers and transmitters and/or optical (e.g., infrared) receivers and transmitters. The specific design and implementation of the wireless communication subsystems 1524 can depend on the communication network(s) over which a mobile device is intended to operate. For example, a mobile device including the illustrated mobile device architecture 1500 can include wireless communication subsystems 1524 designed to operate over a GSM network, a CDMA network, an LTE network, a Wi-Fi network, a Bluetooth network, or any other wireless network. In particular, the wireless communication subsystems 1524 can provide a communications mechanism over which a client browser application can retrieve resources from a remote web server.

An audio subsystem 1526 can be coupled to a speaker 1528 and a microphone 1530 to facilitate voice-enabled functions, such as voice recognition, voice replication, digital recording, and telephony functions.

The I/O subsystem 1540 can include a touch screen controller 1542 and/or other input controller(s) 1545. The touch screen controller 1542 can be coupled to a touch sensitive display system 1546 (e.g., touch screen). The touch sensitive display system 1546 and touch screen controller 1542 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1546. Display output for the touch sensitive display system 1546 can be generated by a display controller 1543. In one embodiment the display controller 1543 can provide frame data to the touch sensitive display system 1546 at a variable frame rate.

In one embodiment a sensor controller 1544 is included to monitor, control, and/or processes data received from one or more of the motion sensor 1510, light sensor 1512, proximity sensor 1514, or other sensors 1516. The sensor controller 1544 can include logic to interpret sensor data to determine the occurrence of one of more motion events or activities by analysis of the sensor data from the sensors.

In one embodiment the I/O subsystem 1540 includes other input controller(s) 1545 that can be coupled to other input/control devices 1548, such as one or more buttons, rocker switches, thumb-wheel, infrared port, USB port, and/or a pointer device such as a stylus, or control devices such as an up/down button for volume control of the speaker 1528 and/or the microphone 1530.

In one embodiment, the memory 1550 coupled to the memory interface 1502 can store instructions for an operating system 1552, including portable operating system interface (POSIX) compliant and non-compliant operating system or an embedded operating system. The operating system 1552 may include instructions for handling basic system services and for performing hardware dependent tasks. In some implementations, the operating system 1552 can be a kernel.

The memory 1550 can also store communication instructions 1554 to facilitate communicating with one or more additional devices, one or more computers and/or one or more servers, for example, to retrieve web resources from remote web servers. The memory 1550 can also include user interface instructions 1556, including graphical user interface instructions to facilitate graphic user interface processing.

Additionally, the memory 1550 can store sensor processing instructions 1558 to facilitate sensor-related processing and functions; telephony instructions 1560 to facilitate telephone-related processes and functions; messaging instructions 1562 to facilitate electronic-messaging related processes and functions; web browser instructions 1564 to facilitate web browsing-related processes and functions; media processing instructions 1566 to facilitate media processing-related processes and functions; location services instructions including GPS and/or navigation instructions 1568 and Wi-Fi based location instructions to facilitate location based functionality; camera instructions 1570 to facilitate camera-related processes and functions; and/or other software instructions 1572 to facilitate other processes and functions, e.g., security processes and functions, and processes and functions related to the systems. The memory 1550 may also store other software instructions such as web video instructions to facilitate web video-related processes and functions; and/or web shopping instructions to facilitate web shopping-related processes and functions. In some implementations, the media processing instructions 1566 are divided into audio processing instructions and video processing instructions to facilitate audio processing-related processes and functions and video processing-related processes and functions, respectively. A mobile equipment identifier, such as an International Mobile Equipment Identity (IMEI) 1574 or a similar hardware identifier can also be stored in memory 1550.

Each of the above identified instructions and applications can correspond to a set of instructions for performing one or more functions described above. These instructions need not be implemented as separate software programs, procedures, or modules. The memory 1550 can include additional instructions or fewer instructions. Furthermore, various functions may be implemented in hardware and/or in software, including in one or more signal processing and/or application specific integrated circuits.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The various embodiments described herein provide efficiency control logic within a data processing system or an electronic device. The efficiency control logic can perform continuous analysis of the efficiency of processor operations and limit the highest levels of processor performance to those operations that may be performed efficiently.

One embodiment provides for a computer implemented method comprising sampling one or more power and performance metrics of a processor; determining an energy cost per instruction based on the one or more power and performance metrics; determining an efficiency metric based on the energy cost per instruction; computing an efficiency control error based on a difference between a current efficiency metric and a target efficiency metric; setting an efficiency control effort based on the efficiency control error; determining a performance control effort, the performance control effort determined by a performance controller for the processor; and adjusting the performance control effort based on the efficiency control effort, wherein adjusting the performance control effort reduces power consumption of the processor.

In a further embodiment, adjusting the performance control effort causes a reduction in a voltage or frequency of the processor or causes a reduction in a requested increase of the voltage or frequency of the processor. In one embodiment, adjusting the performance control effort causes throttling or idling of the processor. The efficiency control effort can be set based on the efficiency control error and a scaling factor. Setting the efficiency control effort can include setting an efficiency control effort based on the efficiency control error and a first scaling factor when the efficiency control effort is to be increased and setting an efficiency control effort based on the efficiency control error and a second scaling factor when the efficiency control effort is to be decreased.

In a further embodiment, sampling the one or more power and performance metrics of a processor includes receiving an energy estimate for the processor from power estimation logic. The power estimation logic can include one or more programmable weights which can be used to determine a power estimate for the processor. The weights can be set using default values or per-processor values.

One embodiment provides for a non-transitory machine-readable medium storing instructions which, when executed by a processor complex including one or more processors, cause the processor complex to perform operations associated with any one of the methods or processes described herein.

One embodiment provides for a data processing system comprising processing logic, an efficiency control effort determination module to determine an efficiency control effort for the processing logic, the efficiency control effort determined based on an energy cost per instruction; a performance control effort input module to receive a performance control effort determined for the processing logic, the performance control effort to set a requested performance level for the processing logic; and a performance control effort limiting module to limit the performance control effort received by the performance control effort input module based on the efficiency control effort, the performance control effort limiting module to cause a reduction in the performance level of the processing logic or a reduction in a requested increase in the performance level of the processing logic. The data processing system can additionally include a power estimator module to provide an energy consumption estimate for the processing logic, where the power estimator module has programmable weights configurable to adjust the energy consumption estimate for the processing logic.

In the foregoing specification, the invention has been described with reference to specific embodiments thereof. However, it will be evident that various modifications and changes can be made thereto without departing from the broader spirit and scope of the invention. The specification and drawings are, accordingly, to be regarded in an illustrative rather than a restrictive sense.

What is claimed is:

1. A computer implemented method comprising:
sampling one or more power and performance metrics of a processor;
determining an energy cost per instruction based on the one or more power and performance metrics of the processor;
determining an efficiency metric based on the energy cost per instruction;
computing an efficiency control error based on a difference between a current efficiency metric and a target efficiency metric;
setting an efficiency control effort based on the efficiency control error;
determining a performance control effort, the performance control effort determined by a performance controller for the processor at least in part based on a dispatch latency for threads scheduled for execution, wherein the dispatch latency includes a latency between receiving a thread dispatch request and dispatching the thread for processing and the performance control effort determines a requested increase in frequency for the processor;
adjusting the performance control effort based on the efficiency control effort, wherein adjusting the performance control effort reduces the requested increase in frequency for the processor to a reduced requested increase in frequency; and
setting the processor to a frequency based on the reduced requested increase in frequency.

2. The computer implemented method as in claim 1, wherein adjusting the performance control effort additionally causes a reduction in a voltage of the processor.

3. The computer implemented method as in claim 1, wherein adjusting the performance control effort additionally causes a reduction in a requested increase of a voltage of the processor.

4. The computer implemented method as in claim 1, wherein adjusting the performance control effort additionally causes throttling or idling of the processor.

5. The computer implemented method as in claim 1, additionally comprising:
receiving the dispatch latency for each thread from a scheduler;
adjusting the performance control effort based on the received dispatch latency;
adjusting the efficiency control effort based on the efficiency control error and a scaling factor; and
adjusting the performance control effort based on the efficiency control effort.

6. The computer implemented method as in claim 5, wherein adjusting the efficiency control effort includes:
adjusting the efficiency control effort based on the efficiency control error and a first scaling factor when the efficiency control effort is to be increased; and
adjusting the efficiency control effort based on the efficiency control error and a second scaling factor when the efficiency control effort is to be decreased.

7. The computer implemented method as in claim 1, wherein sampling the one or more power and performance metrics of a processor includes receiving an energy estimate for the processor from power estimation logic.

8. The computer implemented method as in claim 7, additionally comprising initializing one or more programmable weights for the power estimation logic and, within the power estimation logic, using the one or more programmable weights to determine a power estimate for the processor.

9. The computer implemented method as in claim 8, additionally comprising initializing the one or more programmable weights using per-processor values.

10. The computer implemented method as in claim 8, additionally comprising initializing the one or more programmable weights using default values.

11. A non-transitory machine-readable medium storing instructions which, when executed by a processor complex including one or more processors, cause the processor complex to perform operations comprising:
determining an efficiency metric based on an energy cost per instruction of one or more processors of the processor complex;
computing an efficiency control error based on a difference between a current efficiency metric and a target efficiency metric;
setting an efficiency control effort based on the efficiency control error;
determining a performance control effort, the performance control effort determined by a performance controller for the processor complex at least in part based on a dispatch latency for threads scheduled for execution, wherein the dispatch latency includes a latency between receiving a thread dispatch request and dispatching the thread for processing and the performance control effort determines a requested increase in frequency for the one or more processors of the processor complex;
adjusting the performance control effort based on the efficiency control effort, wherein adjusting the performance control effort reduces the requested increase in the frequency for the one or more processors of the processor complex to a reduced requested increase in the frequency;

reducing a requested increase in the frequency of one or more processors of the processor complex based on the performance control effort; and setting the one or more processors of the processor complex to a frequency based on the reduced requested increase in frequency.

12. The non-transitory machine-readable medium as in claim 11, the operations additionally comprising sampling one or more power and performance metrics of one or more processors of the processor complex and determining the energy cost per instruction based on the one or more power and performance metrics.

13. The non-transitory machine-readable medium as in claim 12, wherein adjusting the performance control effort additionally causes a reduction in a voltage of the processor or causes a throttling or idling of the processor.

14. The non-transitory machine-readable medium as in claim 12, wherein adjusting the performance control effort additionally causes a reduction in a requested increase of a voltage of the processor.

15. The non-transitory machine-readable medium as in claim 12, the operations additionally comprising:
receiving the dispatch latency for each thread from a scheduler;
adjusting the performance control effort based on the received dispatch latency;
adjusting the efficiency control effort based on the efficiency control error and a scaling factor; and
adjusting the performance control effort based on the efficiency control effort.

16. The non-transitory machine-readable medium as in claim 15, wherein adjusting the efficiency control effort includes:
adjusting the efficiency control effort based on the efficiency control error and a first scaling factor when the efficiency control effort is to be increased; and
adjusting the efficiency control effort based on the efficiency control error and a second scaling factor when the efficiency control effort is to be decreased.

17. The non-transitory machine-readable medium as in claim 11, wherein sampling the one or more power and performance metrics of a processor includes receiving an energy estimate for the processor from power estimation logic and the operations additionally comprise initializing one or more programmable weights for the power estimation logic and, within the power estimation logic, using the one or more programmable weights to determine a power estimate for the processor.

18. The non-transitory machine-readable medium as in claim 17, the operation additionally comprising initializing the one or more programmable weights using per-processor values or initializing the one or more programmable weights using default values.

19. A data processing system comprising:
processing logic;
an efficiency control effort determination module to determine an efficiency control effort for the processing logic, the efficiency control effort determined based on an energy cost per instruction;
a performance control effort input module to receive a performance control effort determined for the processing logic, the performance control effort to set a requested performance level for the processing logic, wherein the performance control effort is to be determined at least in part based on a dispatch latency for threads scheduled for execution on the processing logic, the dispatch latency includes a latency between receiving a thread dispatch request and dispatching the thread for processing, and the performance level for the processing logic is based on a number of active processor cores and a frequency of the active processor cores;
a performance control effort limiting module to limit the performance control effort received by the performance control effort input module based on the efficiency control effort, the performance control effort limiting module to cause a reduction in a requested increase in the performance level of the processing logic to a reduced requested increase in the performance level; and
a power state controller to set the processing logic to a performance level that is based on the reduced requested increase in the performance level.

20. The data processing system as in claim 19, additionally comprising a power estimator module to provide an energy consumption estimate for the processing logic, the power estimator module having programmable weights configurable to adjust the energy consumption estimate for the processing logic.

* * * * *